United States Patent
Aio et al.

(10) Patent No.: US 12,063,686 B2
(45) Date of Patent: Aug. 13, 2024

(54) COMMUNICATION DEVICE AND COMMUNICATION METHOD

(71) Applicant: Sony Group Corporation, Tokyo (JP)

(72) Inventors: Kosuke Aio, Tokyo (JP); Yusuke Tanaka, Tokyo (JP); Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 326 days.

(21) Appl. No.: 17/602,286

(22) PCT Filed: Feb. 25, 2020

(86) PCT No.: PCT/JP2020/007319
§ 371 (c)(1),
(2) Date: Oct. 8, 2021

(87) PCT Pub. No.: WO2020/217692
PCT Pub. Date: Oct. 29, 2020

(65) Prior Publication Data
US 2022/0167411 A1    May 26, 2022

(30) Foreign Application Priority Data
Apr. 22, 2019 (JP) ................................ 2019-080648

(51) Int. Cl.
*H04W 74/0816* (2024.01)

(52) U.S. Cl.
CPC .............................. *H04W 74/0816* (2013.01)

(58) Field of Classification Search
CPC ......... H04W 74/0816; H04W 74/0841; H04W 84/12
See application file for complete search history.

(56) References Cited

U.S. PATENT DOCUMENTS

| | | | |
|---|---|---|---|
| 9,461,808 B2 | 10/2016 | Cariou | |
| 2014/0247777 A1* | 9/2014 | Cariou | H04W 74/0816 370/329 |

(Continued)

FOREIGN PATENT DOCUMENTS

| | | |
|---|---|---|
| CN | 105393633 A | 3/2016 |
| JP | 2017-28746 A | 2/2017 |

(Continued)

OTHER PUBLICATIONS

International Search Report and Written Opinion mailed on Apr. 21, 2020, received for PCT Application PCT/JP2020/007319, Filed on Feb. 25, 2020, 8 pages including English Translation.

*Primary Examiner* — Kodzovi Acolatse
*Assistant Examiner* — Anindita Sen
(74) *Attorney, Agent, or Firm* — XSENSUS LLP

(57) ABSTRACT

A communication device that determines a backoff time of multiband transmission is provided.
A communication device includes: a communication unit that transmits and receives wireless signals in a plurality of bands; and a control unit that controls an operation in the communication unit. The control unit sets, for each band, a first random standby time for performing transmission in each of the plurality of bands, sets a second random standby time for performing simultaneous transmission of data in two or more of the plurality of bands, and controls countdown of the second random standby time or the first random standby time of each band on the basis of a comparison between the first random standby time of each band and the second random standby time.

18 Claims, 17 Drawing Sheets

(56) References Cited

U.S. PATENT DOCUMENTS

| | | | |
|---|---|---|---|
| 2015/0171981 A1 | 6/2015 | Kosaka | |
| 2016/0205615 A1* | 7/2016 | Seok | H04W 48/16 |
| | | | 370/338 |
| 2016/0366689 A1* | 12/2016 | Zhang | H04L 5/0091 |
| 2018/0255578 A1* | 9/2018 | Kim | H04W 74/0808 |
| 2020/0178297 A1* | 6/2020 | Park | H04W 74/0808 |

FOREIGN PATENT DOCUMENTS

| | | |
|---|---|---|
| JP | 2018-517374 A | 6/2018 |
| JP | 2018-170621 A | 11/2018 |
| WO | WO-2017131476 A1 | 8/2017 |

* cited by examiner

COMMUNICATION DEVICE AND COMMUNICATION METHOD

CROSS-REFERENCE TO RELATED APPLICATIONS

The present application is based on PCT filing PCT/JP2020/007319, filed Feb. 25, 2020, which claims priority to JP 2019-080648, filed Apr. 22, 2019, the entire contents of each are incorporated herein by reference.

TECHNICAL FIELD

The technology disclosed in the present specification relates to a communication device and a communication method for transmitting and receiving wireless signals.

BACKGROUND ART

In recent years, in order to cope with an increase in required data traffic, there has been a need to increase data capacity and improve the peak throughput in a wireless local area network (LAN). For this reason, multiband transmission in which communication is performed by simultaneously using multiple communication bands (hereinafter also referred to as "bands") has been attracting attention (see Patent Document 1, for example), and has been expected to be standardized as a next-generation standard of IEEE 802.11.

According to the current carrier sense multiple access with collision avoidance (CSMA/CA), backoff in which countdown of a random standby time (hereinafter also referred to as "backoff time") is performed in a primary channel (hereinafter also denoted as "PCH") of each band, and multiband transmission can be started at a time point when the backoff ends and the transmission right is acquired in all the bands. For example, a method has been proposed in which a terminal synchronizes different bands with backoff set for one band to perform common backoff (see Patent Document 2, for example). According to this method, it is easy to match timings at which all bands end the backoff and acquire the transmission right, and it is expected that communication opportunities at the time of multiband transmission increase.

However, if backoff is always performed in other bands in synchronization with a specific band, there is a concern that many points will interfere with the operation of CSMA/CA defined by IEEE 802.11. For example, at a time point when a certain band transitions from a busy state to an idle state, the band can be synchronized with a remaining backoff time of a band for which one terminal is already performing backoff. Hence, the band can acquire a transmission opportunity more easily than other terminals that do not perform multiband transmission, and the transmission opportunity of other terminals that set a backoff time and perform backoff is lost. As a result, an unfair situation may occur among terminals.

Additionally, there are many matters to be considered regarding backoff at the time of retransmission. For example, when collision frequently occurs in a band in which a terminal exists, usually, a longer backoff time is preferentially applied by update processing of the contention window, so that collision with another terminal can be avoided. However, since a terminal that has performed multiband transmission can synchronize a band in which collision has occurred with backoff of another band in which collision has not occurred, the backoff time is not elongated, and a transmission opportunity is acquired more easily than other terminals that set a long backoff time at the time of a collision. Other terminals that perform backoff by setting a longer backoff time at the time of collision lose transmission opportunities. That is, an unfair situation may occur among terminals.

CITATION LIST

Patent Document

Patent Document 1: Japanese Patent Application Laid-Open No. 2017-28746
Patent Document 2: Japanese Patent Application Laid-Open No. 2018-170621

SUMMARY OF THE INVENTION

Problems to be Solved by the Invention

An object of the technology disclosed in the present specification is to provide a communication device and a communication method for performing multiband transmission.

Solutions to Problems

The technology disclosed in the present specification has been made in view of the above problem, and a first aspect thereof is
a communication device including:
a communication unit that transmits and receives wireless signals in a plurality of bands; and
a control unit that controls an operation in the communication unit, in which
the control unit sets, for each band, a first random standby time for performing transmission in each of the plurality of bands, sets a second random standby time for performing simultaneous transmission of data in two or more of the plurality of bands, and controls countdown of the second random standby time or the first random standby time of each band on the basis of a comparison between the first random standby time of each band and the second random standby time.

When there are two or more bands in which the first random standby time is less than the second random standby time, the control unit starts countdown of the second random standby time, and the control unit performs control to simultaneously transmit data using a plurality of bands in which the countdown of the second random standby time has ended.

Additionally, when there are less than two bands in which the first random standby time is less than the second random standby time, the control unit performs control to start countdown of the first random standby time of each of the plurality of bands and perform data transmission in a band in which the countdown of the first random standby time has ended.

Additionally, a second aspect of the technology disclosed in the present specification is
a communication method including the steps of:
setting, for each band, a first random standby time for performing transmission in each of a plurality of bands;
setting a second random standby time for performing simultaneous transmission of data in two or more of the plurality of bands; and controlling countdown of the second random standby time or the first random standby time of each band on the basis of a comparison between the first random standby time of each band and the second random standby time.

Effects of the Invention

According to the technology disclosed in the present specification, it is possible to provide a communication device and a communication method for determining a backoff time during multiband transmission while achieving fairness with peripheral terminals.

Note that the effects described in the present specification are merely examples, and the effects brought by the technology disclosed in the present specification are not limited thereto. Additionally, the technology disclosed in the present specification may further exhibit additional effects in addition to the above effects.

Still other objectives, features and advantages of the technology disclosed in the present specification will become apparent by more detailed description based on the embodiments and accompanying drawings described below.

MODE FOR CARRYING OUT THE INVENTION

Hereinafter, embodiments of a technology disclosed in the present specification will be described in detail with reference to the drawings.

Figure 1:
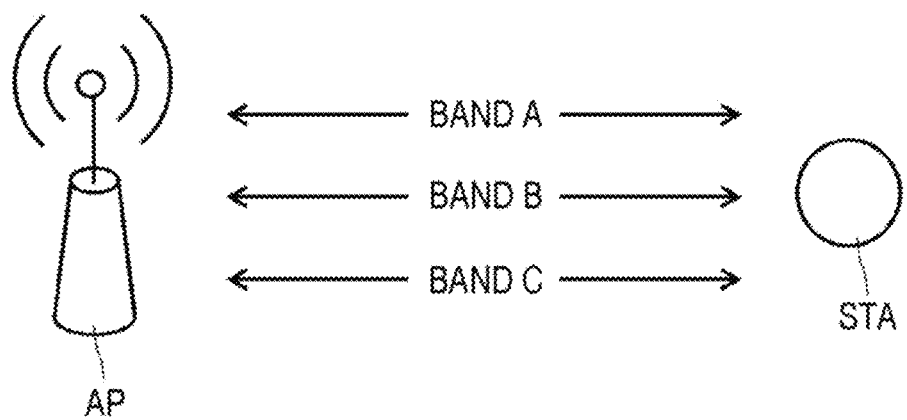
FIG. 1 is a diagram illustrating a configuration example of a communication system.

FIG. 1 schematically illustrates a configuration example of a communication system to which the technology disclosed in the present specification can be applied. The communication system illustrated in FIG. 1 includes one base station or access point (AP) and one slave unit (STAtion: STA) connected to the AP. While only one STA is illustrated for simplification of the drawing in FIG. 1, it is also assumed that two or more STAs are connected to one AP.

Three bands of band A, band B, and band C are available for data communication between the AP and the STA. Each of the band A, band B, and band C includes multiple channels, and one of the multiple channels is a primary channel (PCH). At present (at the time of the present application), the band A and band B among these three bands are assumed to be a 920 MHz band, a 2.4 GHz band, and a 5 GHz band which are allocated as unlicensed bands, and further a 6 GHz band which is expected to be allocated to an unlicensed band in the future. However, the band A and band B are not limited to a combination of specific bands. Additionally, four or more bands may be available between the AP and the STA.

In the present embodiment, when the AP and the STA perform data communication, it is assumed that two or more of the band A, band B, and band C are simultaneously used, that is, multiband transmission can be performed between the AP and the STA. Additionally, four or more bands may be available between the AP and the STA, and multiband transmission using four or more bands simultaneously may be performed.

While the present specification describes an example in which multiband transmission is mainly applied during uplink communication in which an STA performs data transmission to an AP, it goes without saying that multiband transmission can also be applied during downlink communication in which an AP performs data transmission to an STA.

Note that the configuration of the communication system to which the technology disclosed in the present specification can be applied is not limited to that illustrated in FIG. 1. It is sufficient that there are multiple communication devices to which connection is established and there is a communication device as a peripheral terminal for each communication device. The positional relationship among the communication devices is not particularly limited.

Figure 2:
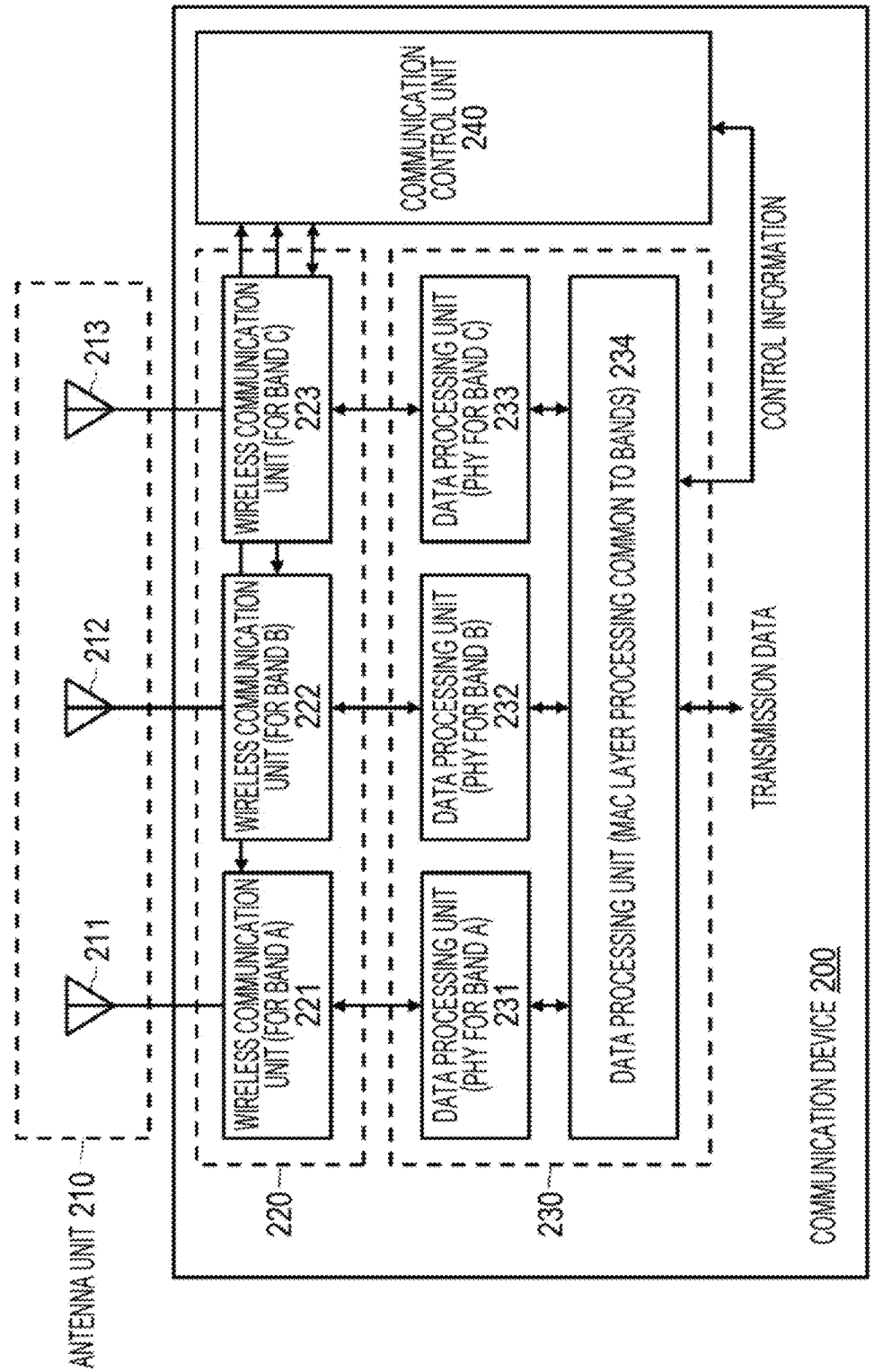
FIG. 2 is a diagram illustrating a functional configuration example of a communication device 200.

FIG. 2 illustrates a functional configuration example of a communication device 200 operable in the communication system to which the technology disclosed in the present specification is applied. The communication device 200 illustrated in FIG. 2 can operate as at least one or both of the AP and the STA in the communication system illustrated in FIG. 1, for example.

The communication device 200 mainly includes an antenna unit 210, a wireless communication unit 220, a data processing unit 230, and a communication control unit 240.

The communication control unit 240 integrally controls the overall operation of the communication device 200, and further performs processing of transferring control information to be communicated to other communication terminals to the data processing unit 230. In particular, in the present embodiment, the communication control unit 240 has a main feature in setting and controlling backoff of each band (band A, band B, and band C) to be used. Specifically, the communication control unit 240 controls setting of a random standby time (corresponding to "normal backoff" to be described later) for performing normal data transmission and a random standby time (corresponding to "MB backoff" to be described later) for performing multiband transmission, start of countdown of each set random standby time, and operation of data transmission (normal data transmission or multiband transmission) at the end of the countdown.

The data processing unit 230 mainly performs processing of generating a transmission signal on the basis of transmission data from an upper layer (not illustrated) of the communication protocol and control information received from the communication control unit 220. Additionally, the data processing unit 230 performs processing of demodulating a reception signal received from the wireless communication unit 220 and extracting reception data and control information.

In a case where the communication device 200 operates as an AP, the data processing unit 230 generates a transmission signal including control information regarding multiband transmission, for example. Additionally, in a case where the communication device 200 operates as an STA, the data processing unit 230 demodulates a reception time signal received from the wireless communication unit 220, extracts control information regarding multiband transmission, and transfers the control information to the communication control unit 240. Note, however, that details of the control information regarding multiband transmission will be described later.

In a case where multiband transmission is performed using multiple bands (band A, band B, and band C) as in the present embodiment, the data processing unit 230 may be formed by sharing a data processing unit 234 that performs data processing of a media access control (MAC) layer, and dividing processing of a PHY layer among the bands and arranging a data processing unit 231 that performs PHY layer processing for the band A, a data processing unit 232 that performs PHY layer processing for the band B, and a data processing unit 233 that performs PHY layer processing for the band C. With this configuration, it is possible to perform communication simultaneously in multiple bands, that is, it is possible to commonly perform overall data management (e.g., sequence number of packet or the like) while enabling multiband communication.

At the time of transmission, the wireless communication unit 220 performs analog conversion on a transmission signal generated by the data processing unit 230, further performs radio frequency (RF) processing such as up-conversion, and generates a wireless signal output from the antenna unit 210. Additionally, at the time of reception, the wireless communication unit 220 performs RF processing such as down-conversion on a wireless signal input to the antenna unit 210, further performs digital conversion to generate a reception signal, and transfers the reception signal to the data processing unit 230.

In a case where multiband transmission is performed using multiple bands (band A, band B, and band C) as in the present embodiment, it is possible to simultaneously perform communication operation of wireless signals in multiple bands by dividing the communication operation among a wireless communication unit 221 and antenna 211 for the band A, a wireless communication unit 222 and antenna 212 for the band B, and a wireless communication unit 223 and antenna 213 for the band C. Note that in a case where the band A, band B, and band C are close in frequency, any of the wireless communication units may be shared.

Figure 3:
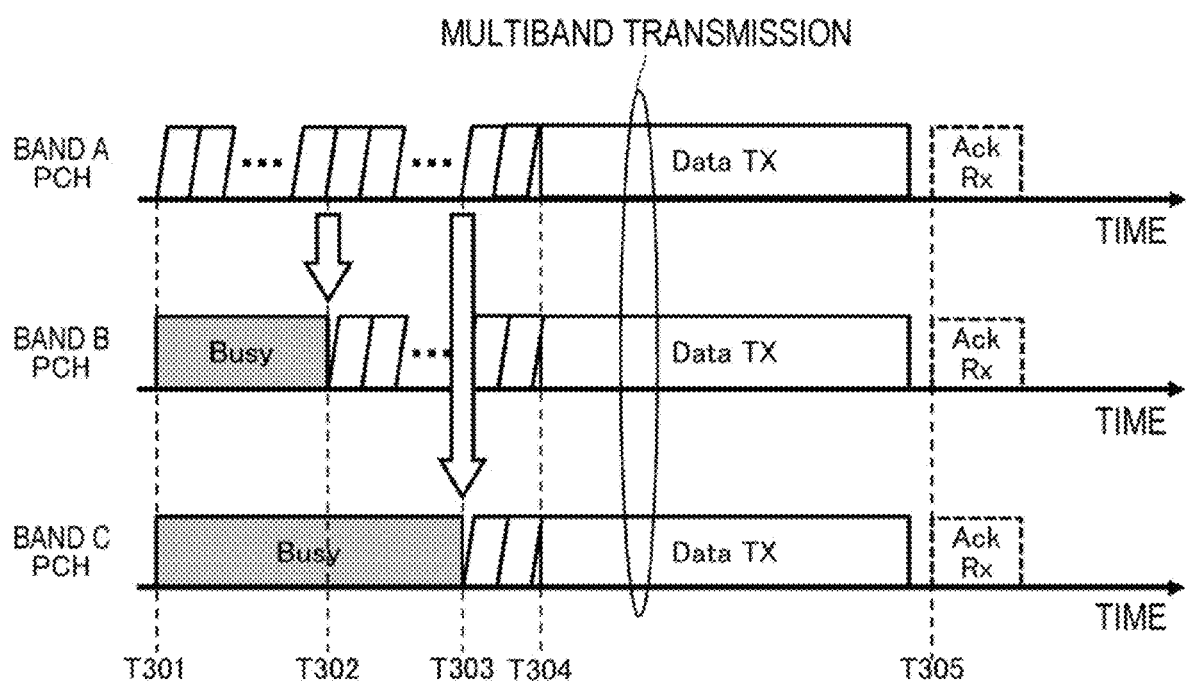
FIG. 3 is a diagram illustrating an example of a communication sequence for performing multiband transmission.

FIG. 3 illustrates an example of a communication sequence for performing multiband transmission. FIG. 3 illustrates an operation example for each of the band A, band B, and band C in a case where the terminal (STA) performs multiband transmission using the primary channel (PCH) of each band. Note, however, that the STA is assumed to have the device configuration illustrated in FIG. 2. In FIG. 3, three horizontal axes are time axes for the bands used by the terminal (STA), and depict communication operations on the time axes.

In a case where the band A is in an idle state but the other bands B and C are each in a busy state, the STA sets a backoff time for the PCH of the band A at time T301 and starts countdown of the backoff time, that is, starts the backoff. In FIG. 3, a section of the band in a busy state is indicated by a gray box.

The backoff time set herein is obtained by using a contention window (hereinafter also denoted as "CW") and slot time defined by IEEE 802.11, and multiplying the slot time by an integer value randomly determined from 0 to CW. In FIG. 3, one slot time is indicated by a parallelogram. The minimum value ($CW_{min}$) and the maximum value ($CW_{max}$) of the CW and the slot time are parameters whose notifications are sent from the AP to the STA at the time of connection (or periodically) as enhanced distributed channel access (EDCA) parameters.

Here, the EDCA parameter may be held for each band or may be held in common for all bands. EDCA is a communication method for performing priority control based on a traffic class defined by IEEE 802.11e. In EDCA, four access categories (hereinafter also denoted as "AC") according to data types, which are voice (AC_VO), video (AC_VI), Vest Effort (AC-BE), and Back Ground (AC_BK), are defined.

Next, assume that the PCH of the band B transitions from a busy state to an idle state at time T302 while the STA is performing backoff in the PCH of the band A. In this case, the STA can set the remaining backoff time in the band A as it is as the backoff time in the band B, and start the backoff in the PCH of the band B.

Additionally, in a case where the PCH of the band C transitions from a busy state to an idle state at time T303 during the backoff of the PCH of the band A and the PCH of the band B, too, the STA can similarly set the remaining backoff time in the band A as it is as the backoff time in the band C and start the backoff in the PCH of the band C as well.

Then, the STA can end the backoff of all the bands A to C at the same timing at time T304, and can immediately start multiband transmission (Data Tx). Then, at time T305 after the multiband transmission ends, the STA receives a reception response signal (Ack) from the transmission destination (e.g., AP) in each of the bands A to C.

In the example of the communication sequence illustrated in FIG. 3, in the band B and the band C, when the busy state transitions to the idle state, the STA does not set the backoff time separately for each band, but performs backoff in synchronization with the remaining backoff time of the band A that is already in the backoff state. For this reason, in the band B and the band C, the STA tends to have a shorter backoff time, that is, a shorter standby time until the start of data transmission than when multiband transmission is not performed (i.e., when backoff is performed separately for each band). In a case where there is no other STA around, for example, the standby time of the STA is shortened, and improvement in throughput can be expected. However, in a case where there is another STA nearby that performs communication only with any one band without performing multiband transmission, there is a concern that the another STA will be robbed of the transmission opportunity by the STA performing multiband transmission and be unable to perform communication.

Figure 4:
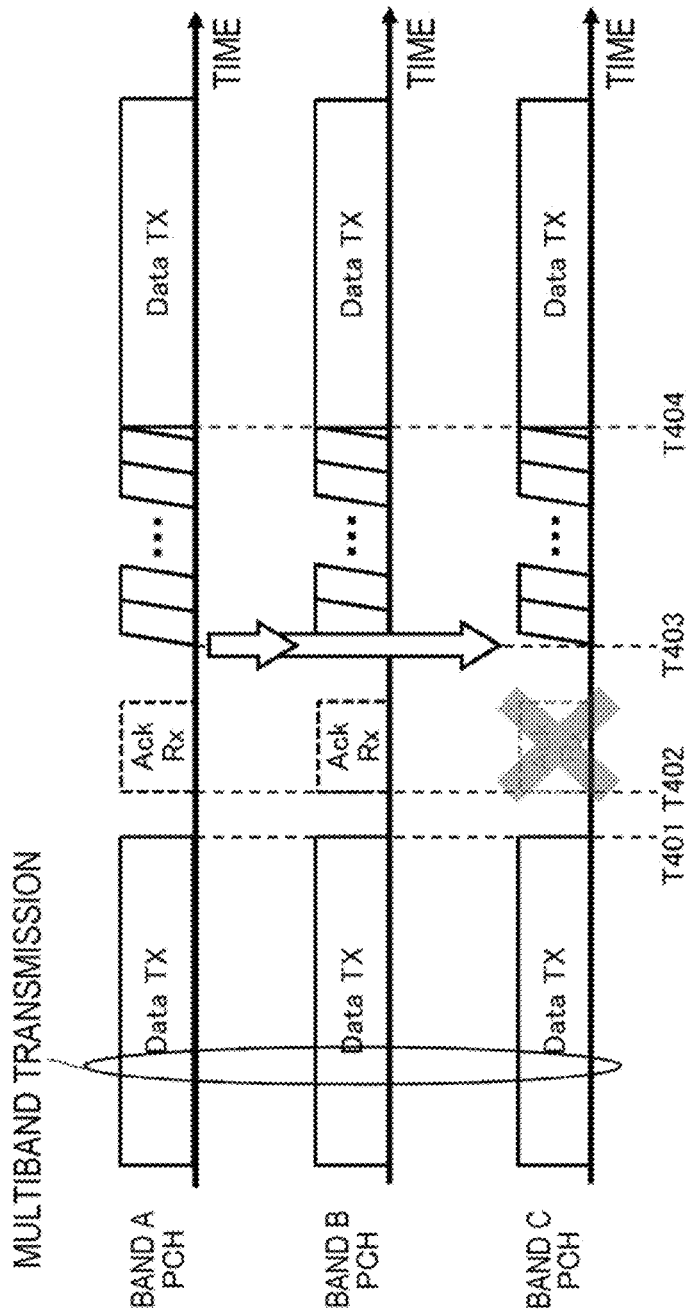
FIG. 4 is a diagram illustrating another example of a communication sequence for performing multiband transmission.

FIG. 4 illustrates another example of a communication sequence for performing multiband transmission. FIG. 4 illustrates an operation example for each of the band A, band B, and band C in a case where a terminal (STA) performs retransmission of multiband transmission using the primary channel (PCH) of each band. Note, however, that the STA is assumed to have the device configuration illustrated in FIG. 2. In FIG. 4, three horizontal axes are time axes for the bands used by the terminal (STA), and depict communication operations on the time axes.

Assume that after completing the multiband transmission using the three bands A to C at time T401, the STA can receive the Ack in the band A and the band B but cannot receive the Ack in the band C at time T402. Then, at the following time T403, the STA starts backoff in each of the bands A to C.

In the case of retransmission when transmitting in a single band, according to the IEEE 802.11 standard, the STA needs to increase the CW by CW×2+1 (note, however, that CW is set within a range not exceeding $CW_{max}$) in the band C in which Ack reception has failed (CW can be reset to $CW_{min}$ if Ack for communication is received in subsequent transmission). As a result, the probability that the backoff time for retransmission in the band C is set to a longer time than that at the time of previous transmission increases. On the other hand, in the band A and the band B in which the Ack reception has been successful, the STA resets the CW to $CW_{min}$, and the probability that the backoff time is set to a short time increases.

However, in the communication sequence in which the backoff for multiband transmission is started in synchronization with the backoff time of a specific band, the backoff time set in the band A can be used as it is in the band C as well, for example. Then, when the backoff of the band A ends at time T404, the STA can also end the backoff of the band B and the band C in synchronization with this and restart the multiband transmission (Data Tx). In this case, although the STA increases the CW in the band C in which reception has failed according to the IEEE 802.11 standard, the probability of the backoff time becoming long does not change. In a case where there is another STA that does not perform multiband transmission and performs communication only with the PCH of the band C, only this another STA performs the operation of widening the CW and setting a longer backoff time, whereby an unfair situation may occur between the terminals.

In order to resolve the situation in which there is unfairness between the terminals as described with reference to FIGS. 3 and 4, the present applicant considers it desirable not to synchronize the backoff for multiband transmission with the backoff (e.g., earliest ending backoff) of a certain band as it is, but to compare the backoff time for multiband transmission with a backoff time determined on the basis of the EDCA parameter for each band and start the backoff for multiband transmission only when the former is longer than the latter.

Against this background, in the present specification, two examples for determining backoff for multiband transmission will be described below.

First example: One of multiple available bands is determined to be a reference band, and the backoff time set in the reference band is set as the backoff for multiband transmission.

Second example: A multiband EDCA parameter is newly defined, and a backoff time set on the basis of the parameter is set as the backoff for multiband transmission.

Note that in the following description, terms defined as follows are used.

MB backoff: Backoff performed synchronously in two or more bands.

Normal backoff: Backoff performed in one band defined by the conventional IEEE 802.11 standard.

Example 1

Figure 5:
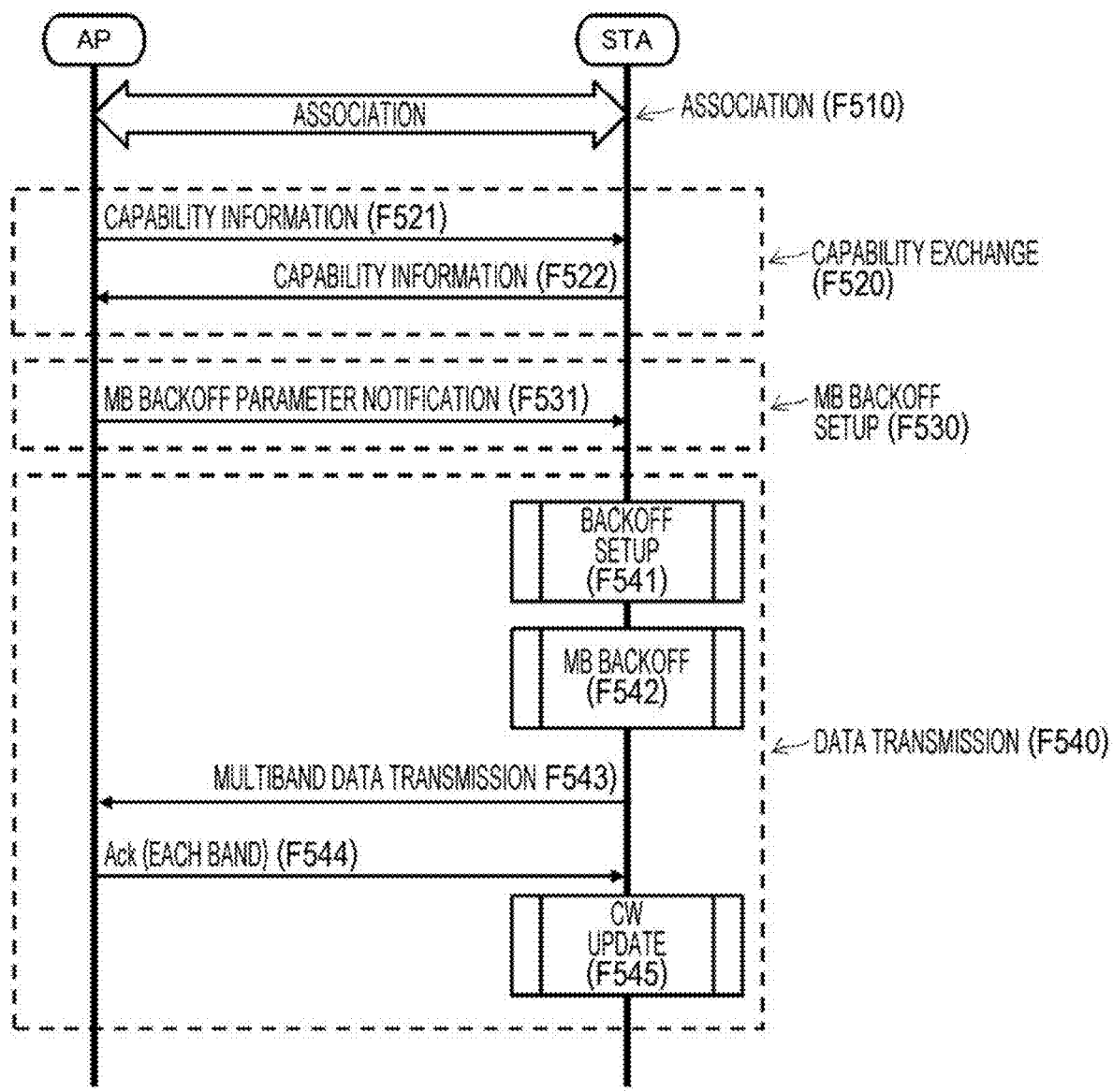
FIG. 5 is a diagram illustrating an example of a communication sequence (common to the first example and second example) performed between an AP and an STA.

FIG. 5 illustrates an example of a communication sequence performed between the AP and the STA as a first example. Note that in a communication system including an AP and an STA, it is assumed that three bands A to C are available as illustrated in FIG. 1. Additionally, assume that each of the AP and the STA is equipped with the device configuration illustrated in FIG. 2 and is capable of multiband communication using two or more of the bands A to C.

In the communication sequence illustrated in FIG. 5, four phases of capability exchange (Capability Exchange), association (Association), MB backoff setup, and data transmission (Data Tx) are mainly assumed. Note that the order of performing the phases is not limited to the example illustrated in FIG. 5. For example, capability exchange may be performed after association. Additionally, the phases are not necessarily separated. For example, capability exchange and association may be performed simultaneously.

In the association phase (F510), connection processing between the AP and the STA is completed. Association is achieved by an association request from the STA and an association response by the AP according to the IEEE 802.11 standard, for example.

In the capability exchange phase (F520), capability information is exchanged between cooperating communication devices (F521, F522). The main feature of the present example is that information as to whether or not an operation regarding MB backoff (backoff performed synchronously in two or more bands) proposed in the present specification is possible is exchanged between the AP and the STA. Details of the capability information exchanged between the AP and the STA and details of the frame used for exchanging the capability information will be described later.

In the MB backoff setup phase (F530), the AP notifies the STA of parameters for an MB backoff operation and backoff time setting (F531). In this phase, a frame including control information regarding MB backoff is transmitted from the AP to the STA. Details will be described later. The execution timing of this phase is not particularly limited. For example, the phase may be performed every beacon interval, or may be performed every time the data transmission phase ends.

In the data transmission phase (F540), actual data transmission between the STA and the AP is performed. In the present example, in order to perform multiband transmission from the STA to the AP, the STA performs backoff setup (F541) and performs MB backoff (F542). Then, after the MB backoff ends, the STA performs multiband transmission (Multi-Band Data Tx) to the AP (F543). Additionally, after ending the data transmission to the AP, the STA receives Ack reception information from the AP in each band used in the multiband transmission (F544), and updates the CW (CW Update) on the basis of whether or not the Ack reception has been successful (F545). Note that the Ack returned by the AP may be Block Ack. Details of each processing procedure of the backoff setting, the MB backoff, and the CW update will be described later.

Next, a frame configuration example used in each phase of capability exchange and MB backoff setup, which are characteristic in the present embodiment, will be described.

Figure 6:
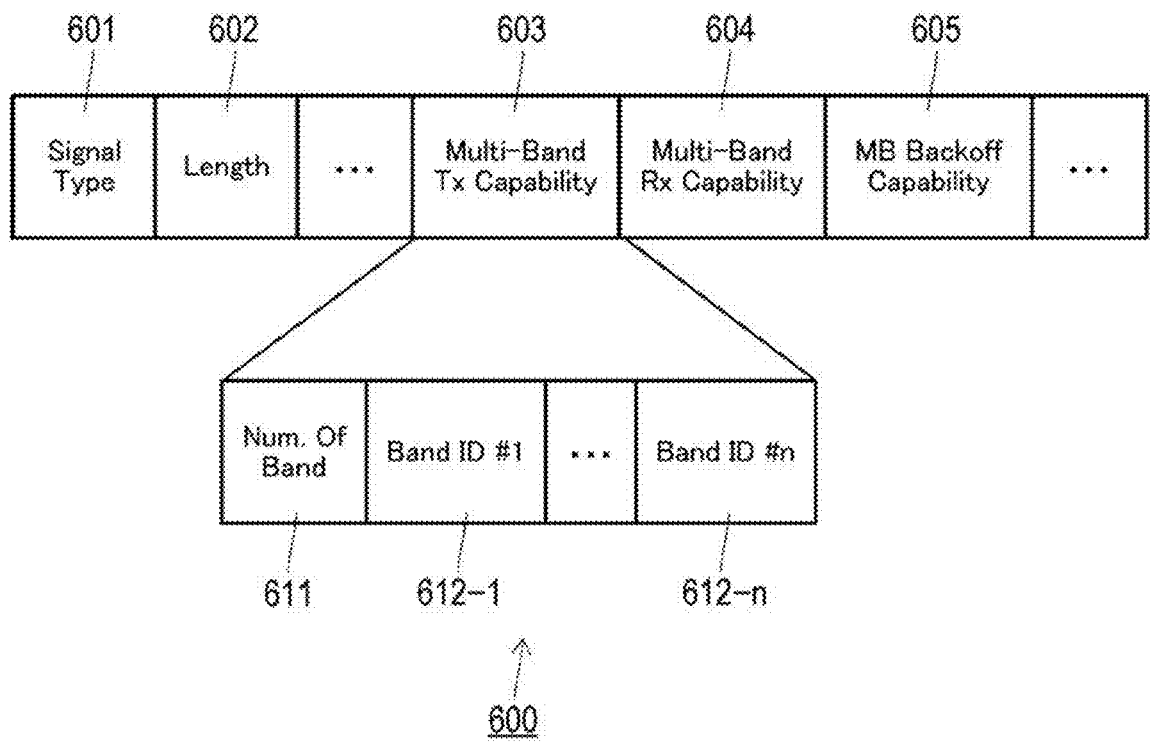
FIG. 6 is a diagram illustrating a configuration example of a capability information frame (common to the first example and second example).

FIG. 6 illustrates a configuration example of a capability information frame 600 exchanged between the AP and the STA. The capability information frame 600 is assumed to be used in the capability exchange phase (F520) in the communication sequence illustrated in FIG. 5. The capability information frame illustrated in FIG. 6 has a main feature in that multiband transmission capability information, multiband reception capability information, and MB backoff capability information are included in capability information exchanged between the AP and the STA.

A Signal Type field 601 includes information indicating that this frame is a frame including capability information exchanged with the AP.

A Length field 602 includes information regarding the length of this frame.

A multiband transmission capability field 603 includes information indicating the number of bands capable of multiband transmission (Num. Of Band) 611 and identifiers (Band IDs) 612-1, . . . , and 612-n of the bands capable of multiband transmission. The Num. Of Band may be set to 0 to indicated that the communication device on the transmission side cannot perform multiband transmission. Additionally, in the field 603, instead of designating the band ID, a flag indicating whether or not multiband transmission is possible may be prepared for each candidate band.

Note that the band "capable of multiband transmission" as used herein refers to a band that can set MB backoff and can be used for multiband data transmission after the countdown of the MB backoff ends, according to the present embodiment (in short, a band in which MB backoff can be set).

A multiband reception capability field 604 includes information on bands capable of multiband reception. Similarly to the multiband transmission capability field 603, the multiband reception capability field 604 may include information indicating the number of bands capable of multiband reception (Num. Of Band) and identifiers (Band IDs) of the bands.

An MB backoff capability field 605 includes information indicating whether or not MB backoff is possible and a method of possible MB backoff. The method of MB backoff here means, for example, a method of controlling MB backoff according to the present example.

For example, when performing uplink data transmission from the STA to the AP, the STA can perform multiband transmission by using two or more bands selected on the basis of the number of bands capable of multiband transmission and the band identification information indicated in the capability information frame received from the AP. On the other hand, the AP goes into standby for data reception in a band indicated to be capable of multiband transmission in the capability information frame received from the STA.

Figure 7:
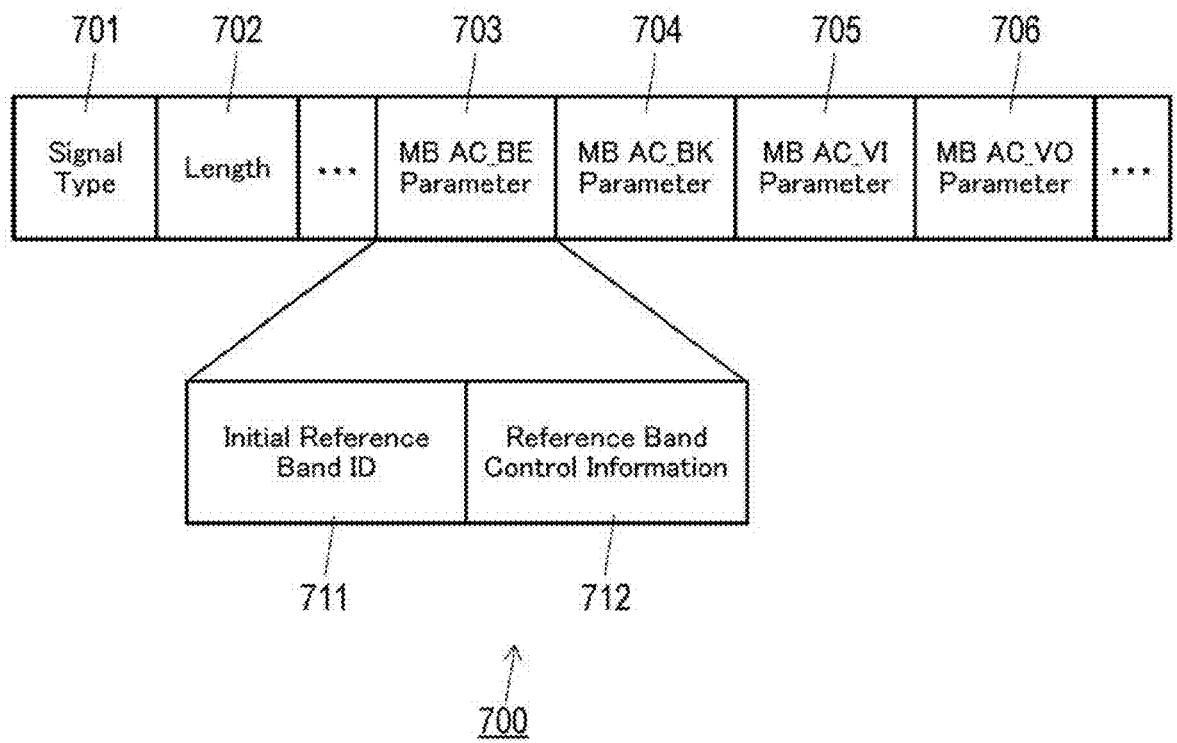
FIG. 7 is a diagram illustrating a configuration example (first example) of an MB backoff setup frame.

FIG. 7 illustrates a configuration example of an MB backoff setup frame 700 exchanged between the AP and the STA. The MB backoff setup frame 700 is assumed to be used in the MB backoff setup phase (F530) in the communication sequence illustrated in FIG. 5. The MB backoff setup frame illustrated in FIG. 7 has a main feature in that information for determining a reference band to be referred to for setting an MB backoff time is included.

A Signal Type field 701 includes information indicating that this frame is an MB backoff setup frame exchanged with the AP. Additionally, a Length field 702 includes information regarding the length of this frame.

MB AC_XX Parameter fields 703, 704, 705, and 706 include information for determining the reference band. In the present embodiment, the multiple parameter fields 703, 704, 705, and 706 are prepared for the types of data to be multiband transmitted in the data transmission phase. Specifically, the type of data corresponds to a traffic class in the EDCA method of IEEE 802.11e, and an MB AC_BE parameter field 703, an MB AC_BK parameter field 704, an MB AC_VI parameter field 705, and an MB AC_VO parameter field 706 including information for determining the reference band are prepared for the ACs.

Specifically, the configurations of the MB AC_XX parameter fields 703, 704, 705, and 706 include at least one of identification information (Initial Reference Band ID) 711 of a reference band that is first set when the STA performs MB backoff, or a reference band determination method (Reference Band Control Information) 712. Note that the parameters indicated by reference numerals 711 and 712 may be defined to be common to all ACs instead of being defined for each AC.

Examples of the method of determining the band to be referred to herein include several methods as illustrated in the following (1) to (4). Note, however, that the method of determining the band to be referred to is not limited thereto.

(1) Always set the band indicated by the Initial Reference Band ID as the reference band.

(2) Set the band indicated by the Initial Reference Band ID as the first reference band, and thereafter, set another band as the reference band for every multiband transmission (or every multiband transmission of a predetermined number of times). Note, however, that the method of selecting the reference band may be in order or at random.

(3) Among multiple bands used for multiband transmission, set the band having the longest backoff time as the reference band.

(4) Set the band having the shortest busy time as the reference band. The busy time may be determined statistically.

According to the method designated by the MB AC_XX parameter in the MB backoff setup frame 700 received from the AP, the STA determines a reference band according to the type (traffic class) of data to be transmitted, and sets a backoff time for MB backoff. Note that the above-described reference band may be instructed to be selected from bands that are always in an idle state.

Next, the data transmission phase will be described. Here, the operation of the communication device 200 (STA in present example) on the data transmission side will be described in the order of backoff setup, MB backoff, and CW update. The operation of the communication device 200 to be described below is basically performed at the initiative of the communication control unit 240.

Figure 8:
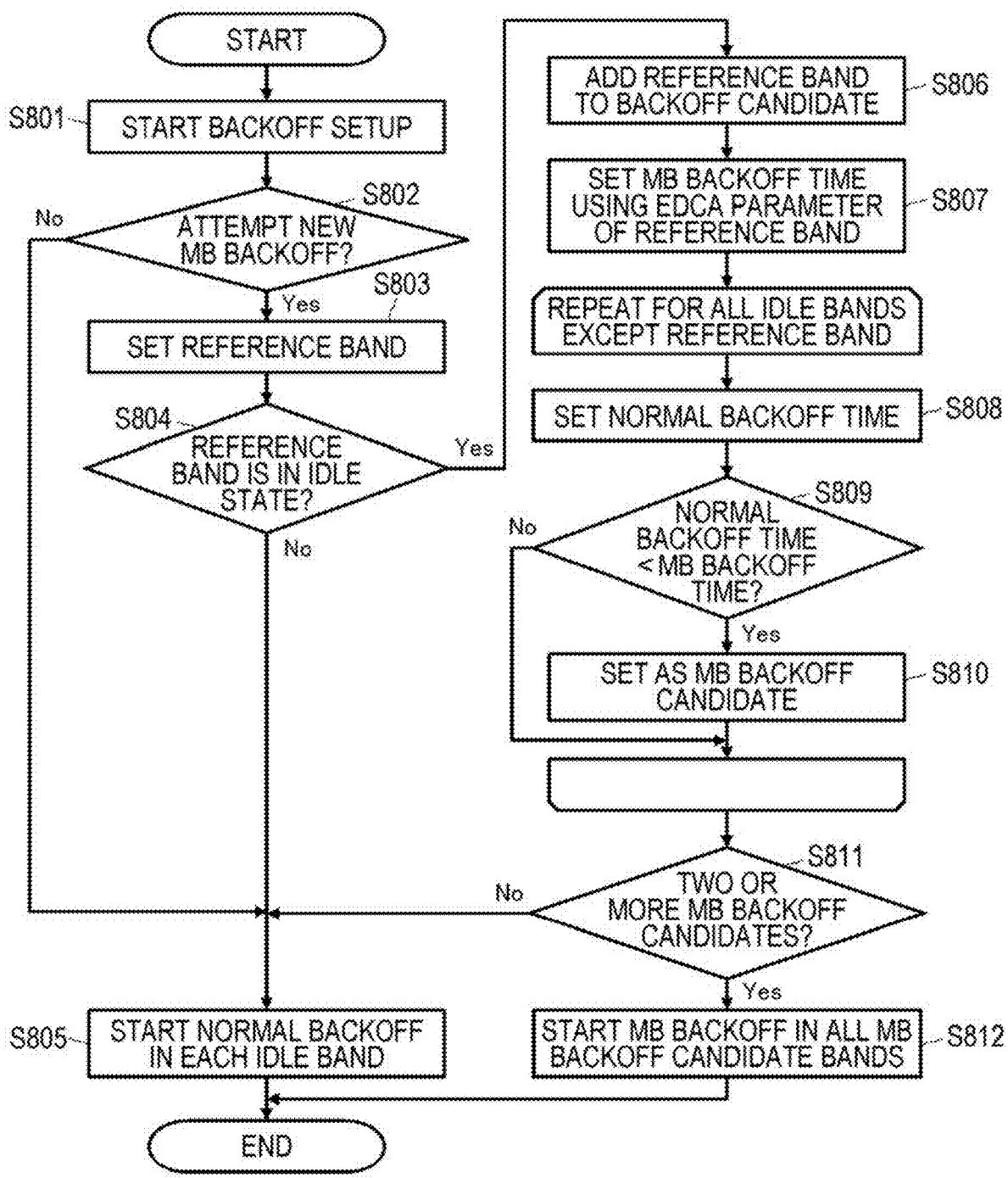
FIG. 8 is a flowchart illustrating a processing procedure (first example) when the STA performs backoff setup.

FIG. 8 illustrates a processing procedure when the STA performs backoff setup, in the form of a flowchart.

When the backoff setup is started (step S801), the STA first determines whether to attempt to newly start MB backoff (step S802).

In a case where the STA attempts to newly start MB backoff (Yes in step S802), the STA determines the reference band according to a method designated by the AP in the MB backoff setup frame (see FIG. 7) (step S803). Specifically, the STA determines the reference band according to the identification information (Initial Reference Band ID) of the reference band or a reference band determination method (Reference Band Control Information) designated for the type of data to be transmitted (or traffic class or AC) in the MB backoff setup frame 700.

Here, in a case where the reference band is in an idle state (Yes in step S804), the STA adds the reference band determined in step S803 to the MB backoff candidates (step S806), and then sets the MB backoff time using the (normal) EDCA parameter set for the reference band (step S807).

Note that the EDCA parameter set for the reference band may be an individual parameter of each band or may be a parameter common to all bands.

Next, the STA repeats the processing of steps S808 to S810 for all bands in an idle state (i.e., bands in which backoff can be performed) other than the reference band, and determines whether or not to add the bands to the MB backoff candidates. Specifically, the STA sets a normal backoff time in the band to be processed (step S808). A normal backoff time is either a newly set time or a remaining time from when the previous backoff is interrupted. Next, the STA checks whether the backoff time is less than the MB backoff time determined in step S807 (step S809). Then, if the normal backoff time is less than the predetermined MB backoff time (Yes in step S809), the STA adds the band to the MB backoff candidates (step S810).

Note that as for the band determined to be out of the MB backoff candidates in steps S809 and S810, when MB backoff is started, normal back may be performed for the band alone to perform data transmission in the single band, or transmission may be put into standby until the next multiband transmission ends.

When the confirmation is completed for all the bands, the STA checks whether there are two or more bands that are MB backoff candidates (step S811). Then, if there are two or more MB backoff candidate bands (Yes in step S811), the STA starts the MB backoff in all the MB backoff candidate bands (step S812). At this time, the MB backoff time determined on the basis of the normal backoff time of the reference band in preceding step S807 is set as the backoff time.

Note that the normal backoff time here means either a new backoff time newly set from the EDCA parameters or an already set and held remaining backoff time.

On the other hand, if the STA does not newly start MB backoff (No in step S802), in a case where the determined reference band is not in an idle state (No in step S804), and in a case where there is one or less MB back candidates (No in step S811), the STA gives up the multiband transmission and performs normal back in each idle band (step S805). Alternatively, in step S805, the STA may go into standby for backoff until the corresponding band transitions to an idle state.

Note that in the MB backoff setup frame 700 from the AP, in a case where "the band for which the longest backoff is set" is instructed as the method of determining the reference band, the STA performs a processing procedure different from that in FIG. 8. In this case, instead of the processing of step S803, the STA first sets a normal backoff time in each idle band, and then sets the band for which the longest normal backoff time is set as the reference band.

Figure 9:
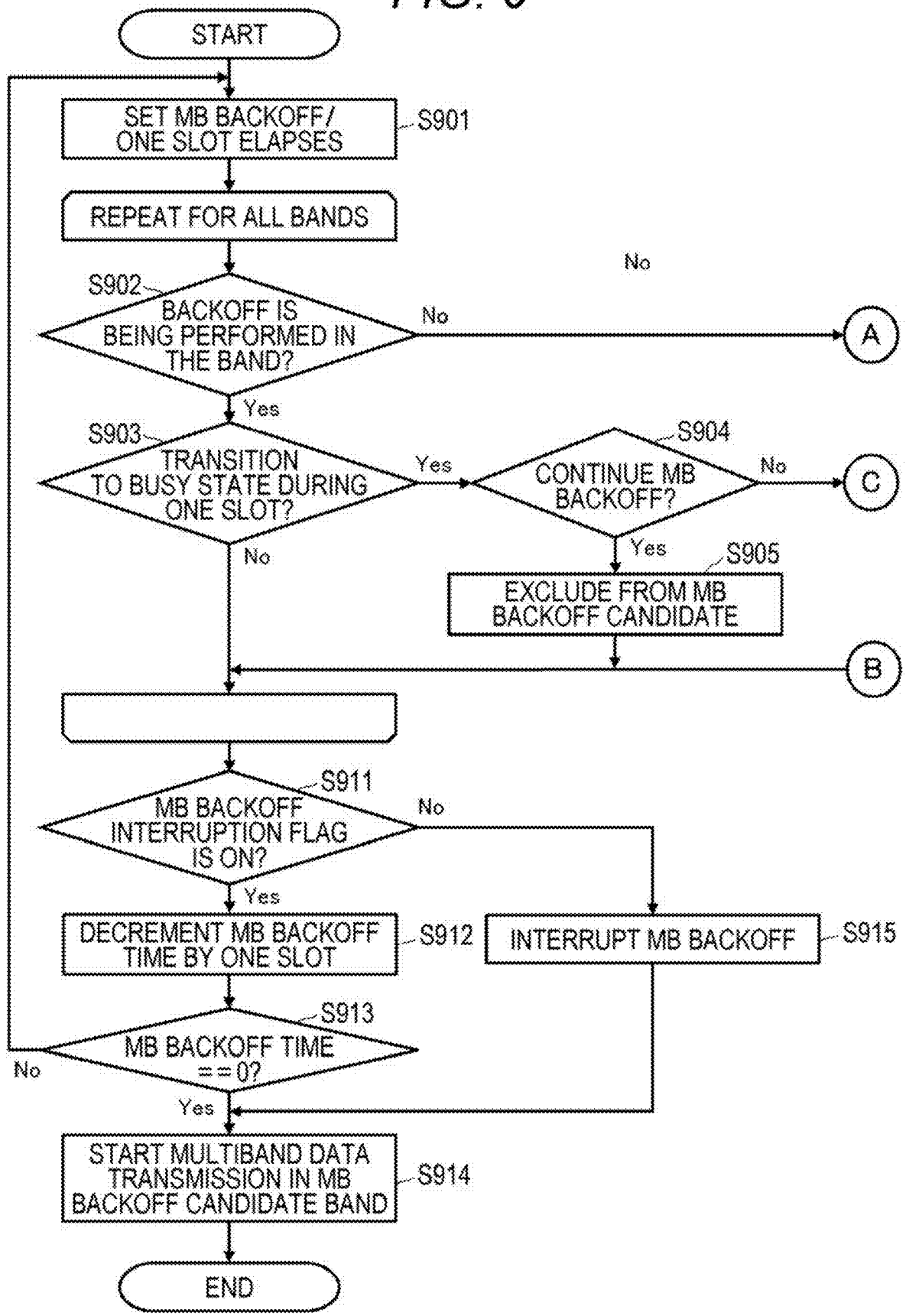
FIG. 9 is a flowchart illustrating a processing procedure (common to the first example and second example) when the STA performs MB backoff.
Figure 10:
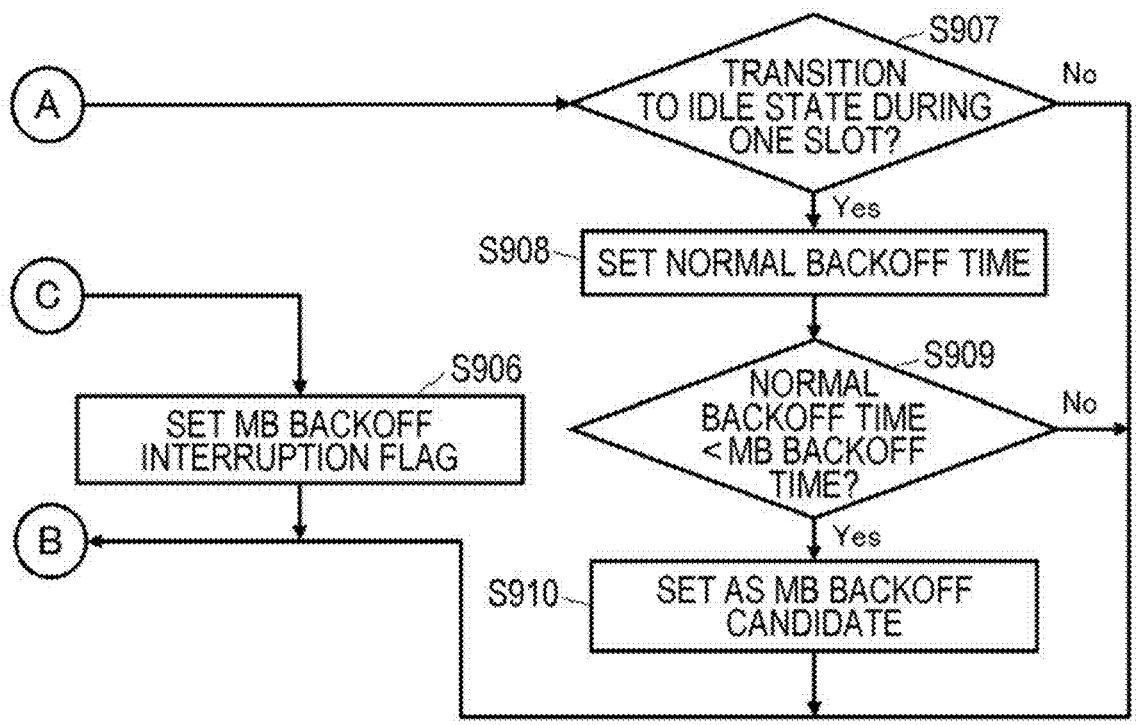
FIG. 10 is a flowchart illustrating a processing procedure (common to the first example and second example) when the STA performs MB backoff.

When the MB backoff is started according to the processing procedure illustrated in FIG. 8 (when Yes in step S811 and processing proceeds to step S812), the STA confirms the state of each band for every slot. FIGS. 9 and 10 illustrate a processing procedure when the STA performs MB backoff, in the form of a flowchart.

Every time one slot of MB backoff elapses (step S901), the STA repeats the processing of steps S902 to S910 for all bands and confirms the state of each band.

Specifically, the STA checks whether backoff is being performed in the target band (step S902). Then, if the backoff is being performed in the band (Yes in step S902), the STA further checks whether the band transitions from an idle state to a busy state during one slot (step S903).

If the band transitions from an idle state to a busy state during one slot (Yes in step S902), the STA further determines whether to continue the MB backoff (step S904). Then, if the MB backoff is to be continued, the STA excludes the band that has transitioned to a busy state from the MB backoff candidates (step S905). Additionally, if the MB backoff is not to be continued, the STA sets an MB backoff interruption flag (step S906).

On the other hand, if backoff is not being performed in the target band (No in step S902), the STA checks whether or not the band transitions from a busy state to an idle state during one slot (step S907).

Then, if the band transitions from a busy state to an idle state during one slot (Yes in step S907), the STA sets a normal backoff time in the band (step S908). A normal backoff time is either a newly set time or a remaining time from when the previous backoff is interrupted. Next, the STA checks whether the normal backoff time is less than the MB backoff time already determined (step S909). Then, if the normal backoff time is less than the predetermined MB backoff time (Yes in step S909), the STA adds the band to the MB backoff candidates (step S910). On the other hand, if the normal backoff time is equal to or more than the predetermined MB backoff time (No in step S909), the STA does not add the band to the MB backoff candidates.

Then, after confirming the states of all the bands, the STA checks whether the MB backoff interruption flag is set (step S911).

If the MB backoff interruption flag is not set (Yes in step S911), the STA decrements the MB backoff time by one slot (step S912), and checks whether the MB backoff time has reached 0 (step S913). Then, if the MB backoff time reaches 0 (Yes in step S913), the STA starts multiband data transmission using two or more MB backoff candidate bands (step S914).

Additionally, if the MB backoff time has not yet reached 0 (No in step S913), the processing returns to step S901, and the STA repeatedly confirms the state of each band in the next one slot.

Additionally, if the MB backoff interruption flag is set (No in step S911), the STA interrupts the MB backoff (step S915). At this time, the STA can resume the interrupted MB backoff at a time point when the band that has transitioned to a busy state returns to an idle state. Then, multiband data transmission is started using the MB backoff candidate bands (step S914).

Figure 11:
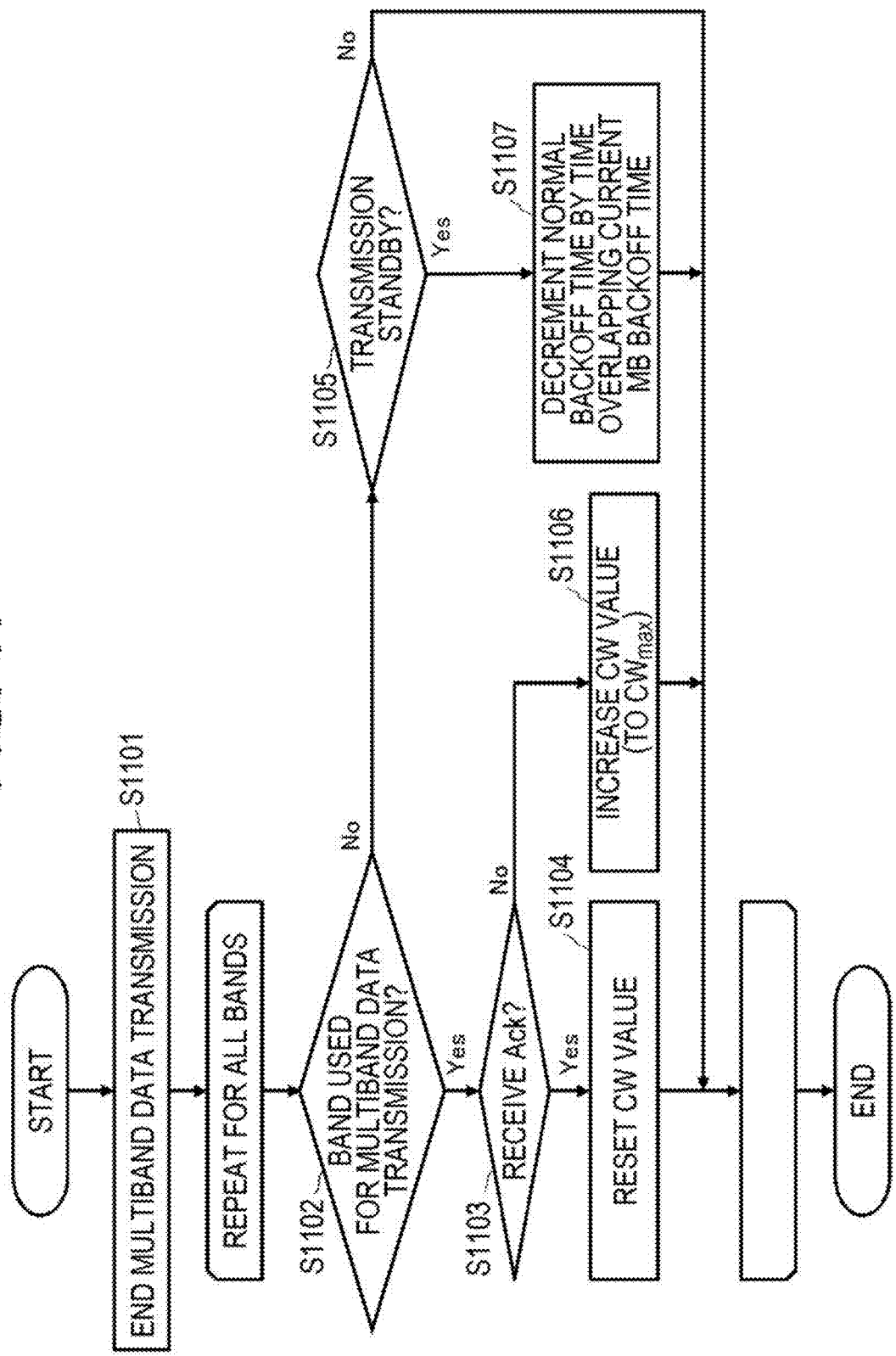
FIG. 11 is a flowchart illustrating a processing procedure (first embodiment) for the STA to update a CW.

FIG. 11 illustrates a processing procedure for the STA to update the CW, in the form of a flowchart.

When the multiband data transmission ends (step S1101), the STA repeats the processing of steps S1102 to S1107 for all bands, and sequentially performs processing for updating the CW value for each band.

First, the STA checks whether the band to be processed is a band used for multiband data transmission (step S1102).

If the band has been used for multiband data transmission (Yes in S1102), the STA further checks whether Ack has been received in this band (step S1103). Then, if the Ack reception has been successful (Yes in step S1103), the STA resets the CW value of this band (step S1104).

On the other hand, if the Ack reception has failed (No in step S1103), the STA increases the CW value of this band (step S1106). Note, however, that the increase in the CW value in step S1106 is performed until the CW value reaches the maximum value ($CW_{max}$).

Additionally, if the band to be processed has not been used for multiband data transmission (No in step S1102), the STA further checks whether the band has been on transmission standby (step S1105). As described above, as for the band determined to be out of the MB backoff candidates, there are a case where normal backoff is performed for the band alone to perform data transmission in the single band, and a case where transmission is put into standby until the next multiband transmission ends.

Then, if the band has been on transmission standby (Yes in step S1105), the STA decrements the normal backoff time of the band by a time overlapping between the transmission standby section and the current MB backoff time (step S1107). As a result, even the band in which the STA could not perform multiband data transmission this time will be included in the MB backoff candidates at the time of the next communication, and there is a high possibility that multiband data transmission can be performed.

Figure 12:
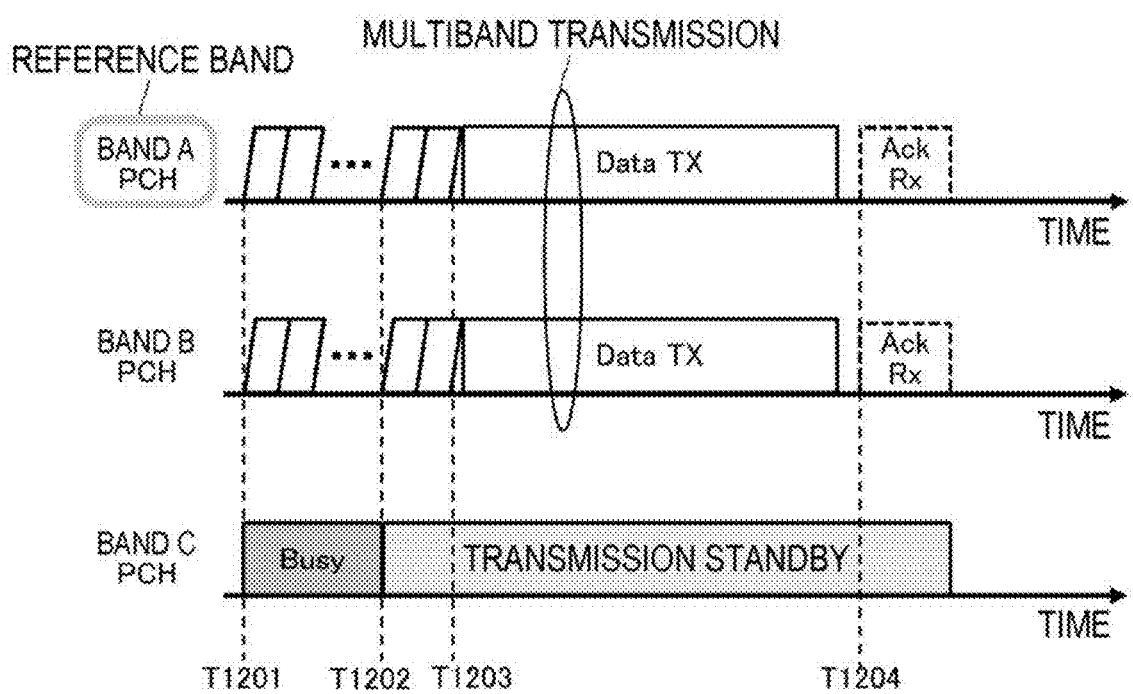
FIG. 12 is a diagram illustrating an example of a communication sequence (first example) for performing multiband transmission.

FIG. 12 illustrates an example of a communication sequence for performing multiband transmission. FIG. 12 illustrates an operation example for each of the band A, band B, and band C in a case where the STA performs the multiband transmission using the primary channel (PCH) of each band while performing MB backoff according to the processing procedures illustrated in FIGS. 9 and 10. In FIG. 12, three horizontal axes are time axes for the bands used by the terminal (STA), and depict communication operations on the time axes.

It is assumed that the STA sets the band A as the reference band according to the processing procedure illustrated in FIG. 8 (or on the basis of MB backoff setup frame received from AP). Accordingly, a normal backoff time set for the band A by the STA using normal EDCA parameters is the MB backoff time.

In a case where the band A and the band B are in an idle state, but the band C is in a busy state, the STA sets the backoff time for the PCH of the band A and the band B at time T1201 and starts the backoff. Here, since the normal backoff time set for the band B is less than the MB backoff time, it is assumed that the MB backoff is started in the band A and the band B. In FIG. 12, a section of the band C in a busy state is indicated by a dark gray box. Additionally, one slot of the backoff time in the band A and the band B is indicated by a parallelogram.

In the example illustrated in FIG. 12, the band C transitions from the busy state to an idle state at time T1202 when the STA is performing backoff in each of the band A and the band B.

In the example of a communication sequence illustrated in FIG. 3, when the band C transitions to an idle state while the backoff is executed in each of the band A and the band B, the backoff time of the band C can be synchronized with the remaining backoff time of the band A and the band B as it is, shortening the standby time. Since the standby time of the STA is shortened, unfairness occurs between the STA and the peripheral terminals.

On the other hand, in a case where the STA follows the MB backoff processing procedure illustrated in FIGS. 9 and 10, the STA compares the normal backoff time determined for the band C with the MB backoff times of the band A and the band B at time T1202, and adds the band C to the MB backoff candidates only when the normal backoff time is less than the MB backoff time.

In the example illustrated in FIG. 12, since the normal backoff time determined for the band C is longer than the remaining MB backoff time of the band A and the band B, the band C is not added to the MB backoff candidates. As a result, the STA does not perform multiband data transmission in the band C, and goes into standby for transmission after time T1202 (while there may be a case where STA starts normal backoff in band C (as described above), STA is assumed to go into transmission standby in this case). In FIG. 12, the section of the band C in the standby state is indicated by a light gray box.

Thereafter, when the MB backoff of the band A and the band B ends at time T1203, the STA starts multiband data transmission using the band A and the band B. Then, at a time T1204 after the multiband transmission ends, the STA receives a reception response signal (Ack) from the transmission destination (e.g., AP) in each of the band A and band B.

As described above, in the example of a communication sequence illustrated in FIG. 12, even if the band C transitions to an idle state while backoff is performed in each of the band A and the band B, the band C is not synchronized with the remaining backoff time of the band A and the band B. Hence, the STA does not perform multiband data transmission and goes into standby for transmission in the band C. Accordingly, there is no unfairness between the STA and the peripheral terminals.

Note that in a case of going into standby for transmission in the band C, the STA decrements the normal backoff time of the band C by a time overlapping between the transmission standby section and the current MB backoff time. As a result, even in the band C in which the STA could not perform multiband data transmission this time will be included in the MB backoff candidates at the time of the next communication, and there is a high possibility that multiband data transmission can be performed.

Figure 13:
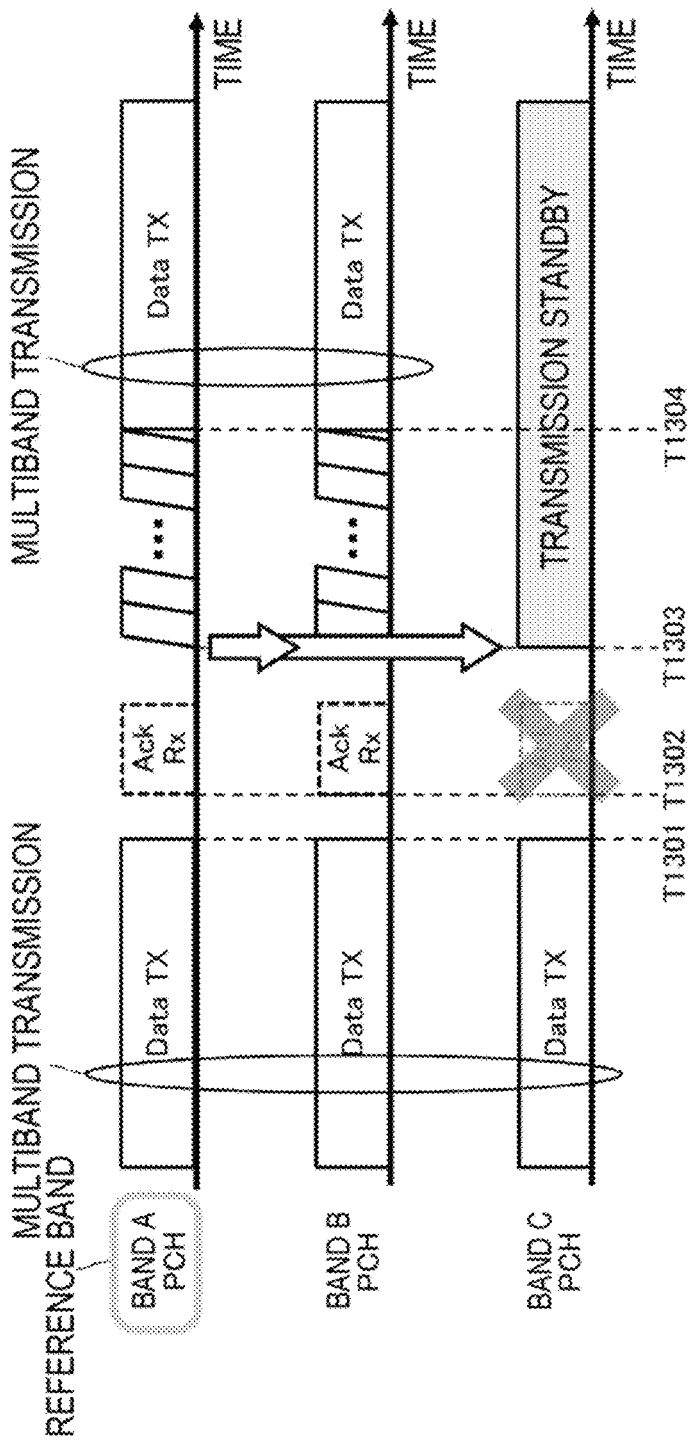
FIG. 13 is a diagram illustrating another example of a communication sequence (first example) for performing multiband transmission.

FIG. 13 illustrates another example of a communication sequence for performing multiband transmission. FIG. 13 illustrates an operation example for each of the band A, band B, and band C in a case where the STA performs retransmission of multiband transmission using the primary channel (PCH) of each band Note, however, that the STA is assumed to have the device configuration illustrated in FIG. 2. In FIG. 13, three horizontal axes are time axes for the bands used by the terminal (STA), and depict communication operations on the time axes.

It is assumed that the STA sets the band A as the reference band according to the processing procedure illustrated in FIG. 8 (or on the basis of MB backoff setup frame received from AP). Additionally, assume that the STA updates the CW value according to the processing procedure illustrated in FIG. 11 after the first multiband transmission ends.

Assume that after completing the multiband transmission using the three bands A to C at time T1301, the STA can receive the Ack in the band A and the band B but cannot receive the Ack in the band C at time T1302.

The backoff time for retransmission in the band C in which reception of Ack has failed is set to be longer than that at the time of previous transmission. In the example of a communication sequence illustrated in FIG. 4, since the backoff time set in the band A which is the reference band can be used as it is in the band C as well, the standby time in the band C becomes short, and unfairness occurs between the STA and the peripheral terminals.

On the other hand, in a case where the STA updates the CW value according to the processing procedure illustrated in FIG. 11, the STA resets the CW value in the band A and the band B in which the Ack reception has been successful, and increases the CW value in the band C in which the Ack reception has failed. As a result, the possibility that the STA sets a longer backoff time in the band C increases, and thus the unfairness among the terminals is corrected.

Additionally, in a case where the STA performs the backoff setup according to the processing procedure illustrated in FIG. 8, the STA sets the band A as the reference band, adds the band A to the MB backoff candidates, sets the MB backoff time, sets a normal backoff time for each of the band B and the band C, compares the normal backoff time set for each of the band B and the band C with the MB backoff time of the band A by the STA itself, and adds only the band whose normal backoff time is less than the MB backoff time to the MB backoff candidates. In the example illustrated in FIG. 13, since the STA sets a normal backoff time shorter than the MB backoff time to be shorter in the band B in which the Ack reception has been successful, the STA adds the band B to the MB backoff candidates. On the other hand, there is a high possibility that the STA sets a normal backoff time equal to or longer than the MB backoff time in the band C in which the reception of the Ack has failed. In the example illustrated in FIG. 13, since the STA sets a normal backoff time equal to or longer than the MB backoff time for the band C at the time of retransmission, the STA does not add the band C to the MB backoff candidates.

Hence, at the following time T1303, the STA starts MB backoff in the band A and the band B. Then, when the MB backoff of the band A and the band B ends at time T1304, the STA starts multiband data transmission. On the other hand, the STA goes into standby for transmission in the band C after time T1303.

As described above, in the example of a communication sequence illustrated in FIG. 13, when a long backoff is set in the band C in which the Ack reception has failed, the transmission is put into standby and multiband data transmission (retransmission) is not performed in the band C. Accordingly, there is no unfairness between the STA and the peripheral terminals.

Note that even if the CW value of the band C is increased, a shorter backoff time can be set. In such a case, the band C is also added to the MB backoff candidates, and backoff synchronized with the band A and the band B can be performed.

Additionally, in a case of going into standby for transmission in the band C, the STA decrements the normal backoff time of the band C by a time overlapping between the transmission standby section and the current MB backoff time. As a result, even in the band C in which the STA could not perform multiband data transmission this time will be included in the MB backoff candidates at the time of the next communication, and there is a high possibility that multiband data transmission can be performed.

Example 2

In the first example, a reference band is determined from among multiple available bands, and the MB backoff time set in the reference band is compared with the normal backoff time of the other bands. Thus, backoff is set so as to eliminate the unfairness between the STA and the peripheral terminals, and multiband data transmission is performed. However, the STA cannot always set an optimal reference band.

In other words, the STA sets the reference band on the basis of the MB backoff setup frame received from the AP, but the AP does not always grasp the optimum reference band.

Figure 14:
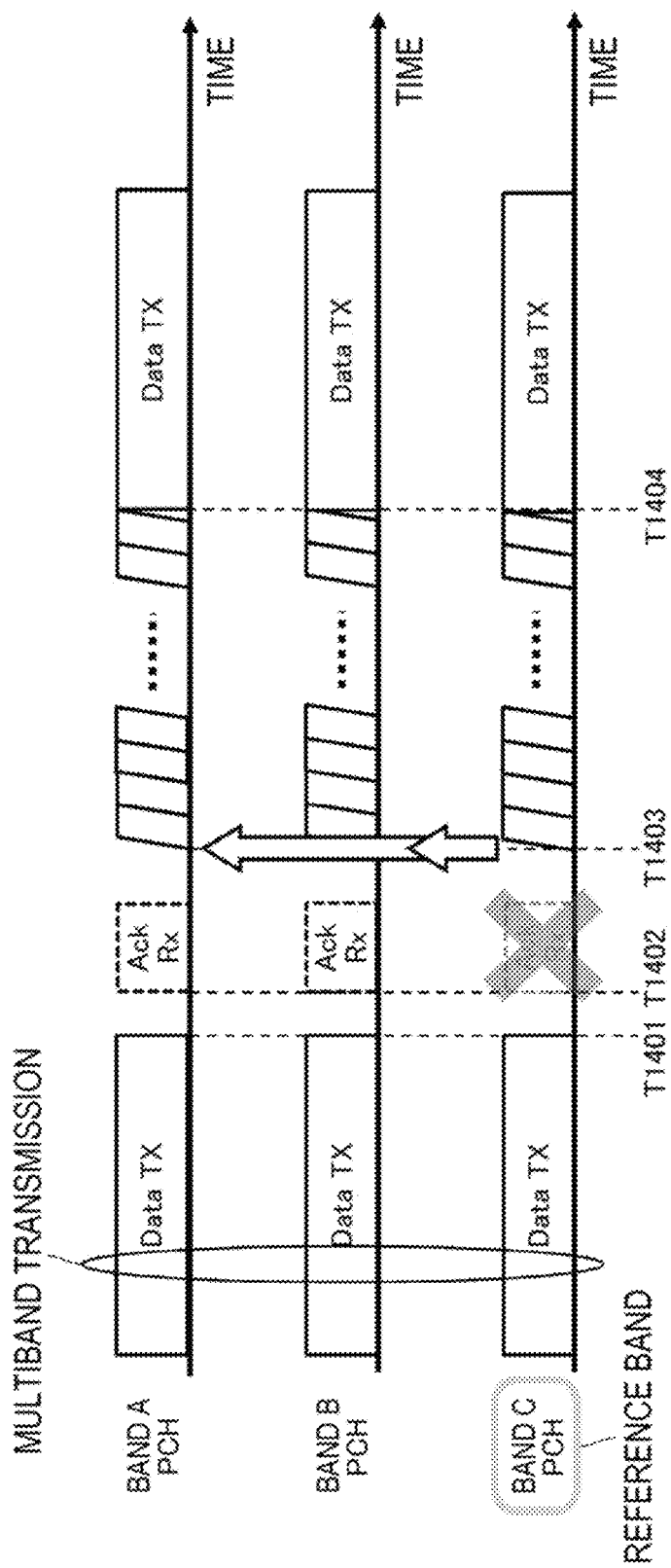
FIG. 14 is a diagram illustrating an example of a communication sequence for performing multiband transmission assumed in the first example.

FIG. 14 illustrates an example of a communication sequence for performing multiband transmission assumed in the first example. FIG. 14 illustrates an operation example for each of the band A, band B, and band C in a case where the STA performs multiband transmission and retransmission using the primary channel (PCH) of each band Note, however, that the STA is assumed to have the device configuration illustrated in FIG. 2. In FIG. 14, three horizontal axes are time axes for the bands used by the terminal (STA), and depict communication operations on the time axes. Note, however, that the STA is assumed to operate according to the processing procedure illustrated in FIGS. 8 to 11.

Assume that after completing the multiband transmission using the three bands A to C at time T1401, the STA can receive the Ack in the band A and the band B but cannot receive the Ack in the band C at time T1402.

Since the STA updates the CW value according to the processing procedure illustrated in FIG. 11, the STA resets the CW value in the band A and the band B in which the Ack reception has been successful, and increases the CW value in the band C in which the Ack reception has failed. As a result, the STA sets a longer backoff time in the band C.

Thereafter, assume that the STA sets the band C as the reference band when performing the backoff setup according to the processing procedure illustrated in FIG. 8. In this case, in order to perform multiband data transmission, the STA may have to set a longer backoff time for the band A and the band B as well. As a result, the STA starts the MB backoff in each of the bands A to C at time T1403. Then, after the elapse of the long backoff time, the STA can start data transmission at time T1404. If the backoff time is long, there is an increased possibility that a peripheral terminal ends the backoff earlier and acquires the transmission right in any one of the bands A to C during that time, which in turn creates a disadvantage for the STA itself.

Against this background, in a second example, instead of referring to the backoff time determined in the reference band in other bands as in the first example, a multiband EDCA (hereinafter also denoted as "MB EDCA") parameter is newly defined, and the MB backoff candidate is added on the basis of comparison with an MB backoff time set by the MB EDCA parameter.

In the second example, a communication sequence performed between an AP and an STA for multiband data transmission is similar to that in the first example, and assumes four phases: capability exchange (Capability Exchange), association (Association), MB backoff setup, and data transmission (Data Tx) (see FIG. 5). Here, detailed description is omitted.

Additionally, in the second example, since the capability information frame exchanged between the AP and the STA in the capability exchange phase is similar to that in the first example (refer to FIG. 6), detailed description thereof is omitted here.

Additionally, in the second example, since the method of determining the backoff for multiband data transmission is different from that in the first example, the MB backoff setup frame for the AP to control the MB backoff in the STA is different from that in the first example.

Figure 15:
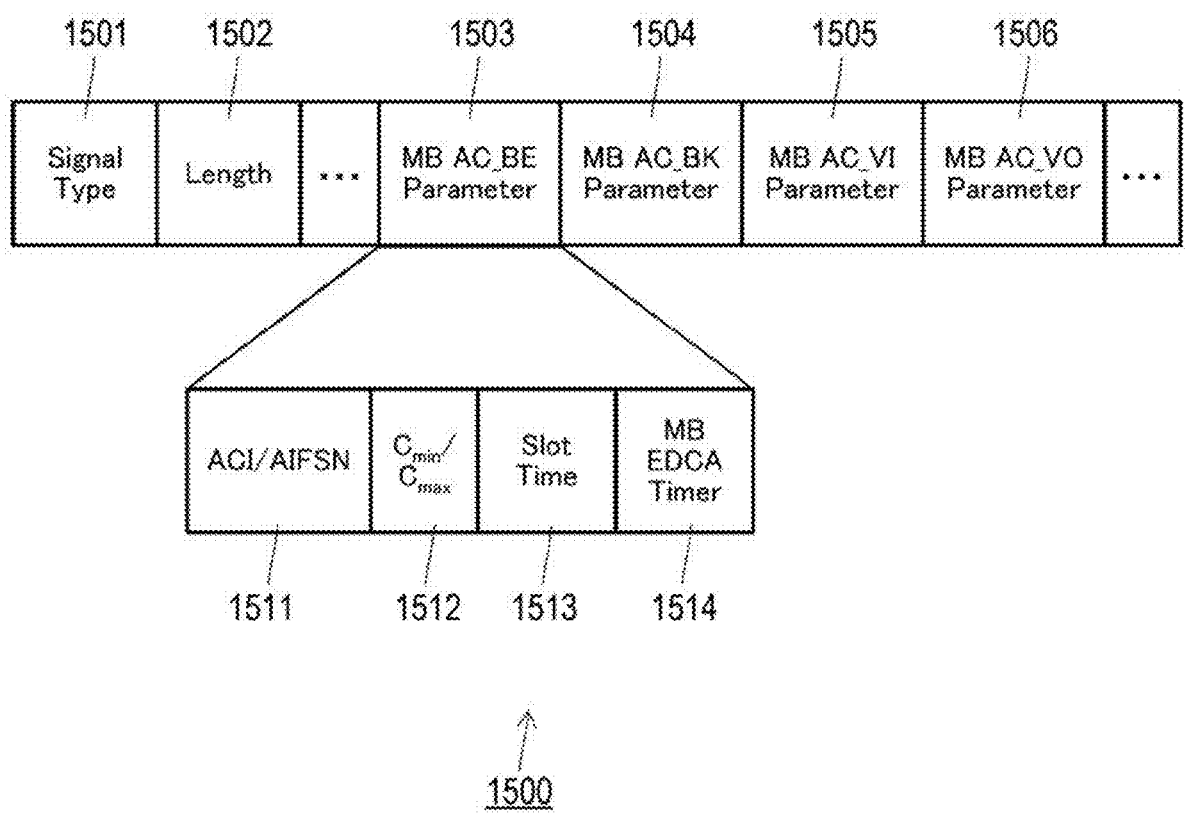
FIG. 15 is a diagram illustrating a configuration example (second example) of an MB backoff setup frame.

FIG. 15 illustrates a configuration example of an MB backoff setup frame 1500 exchanged between the AP and the STA in the second example. The MB backoff setup frame 1500 is assumed to be used in the MB backoff setup phase (F530) in the communication sequence illustrated in FIG. 5.

A Signal Type field 1501 includes information indicating that this frame is an MB backoff setup frame exchanged with the AP. Additionally, a Length field 1502 includes information regarding the length of this frame.

Each parameter field of the MB AC_BE parameter field 1503, the MB AC_KE parameter field 1504, the MB AC_VO parameter field 1505, and the MB AC_VI parameter field 1506 includes a parameter value for determining a reference band for each traffic class (or each AC) defined in IEEE 802.11 (or EDCA). The difference from the first example is that information in each parameter field of the MB AC_BE parameter field 1503, the MB AC_KE parameter field 1504, the MB AC_VO parameter field 1505, and the MB AC_VI parameter field 1506 includes a parameter value necessary for setting an MB backoff time.

Specifically, AC index (ACI)/arbitration inter frame space number (AIFSN) 1511, $CW_{max}/CW_{min}$ 1512, Slot Time 1513, and MB EDCA Timer 1514 are included in each of the parameter fields of the MB AC_BE parameter field 1503, the MB AC_KE parameter field 1504, the MB AC_VO parameter field 1505, and the MB AC_VI parameter field 1506. The ACI/AIFSN 1511 indicates information such as an AC number and a standby time after the end of data transmission (AIFSN is a parameter for setting a transmission interval of a frame.). The $CW_{min}/CW_{max}$ 1512 indicates the minimum value and the maximum value of CW (described above), respectively. The Slot Time 1513 indicates a slot time value (described above).

The MB EDCA Timer 1514 includes timer information for invalidating MB backoff. For example, in a case where multiband data transmission cannot be performed (or in a case where communication is not successful, for example) even once during time information set in the MB EDCA Timer 1514 after the STA starts MB backoff, the STA may temporarily cancel the MB backoff and change to normal EDCA in each band.

Note that among the pieces of information in FIG. 15, there may be a parameter that is not included in the frame 1500 but is set as a standard. For example, the slot time value may be uniformly determined by a standard instead of being determined by the AP. In this case, the slot time value of MB EDCA and the slot time value of normal EDCA may be different values.

Additionally, the second example is different from the first example in that, when it is determined to newly set an MB backoff time, the MB backoff time is set using the MB EDCA parameter notified from the AP through the MB backoff setup frame.

Figure 16:
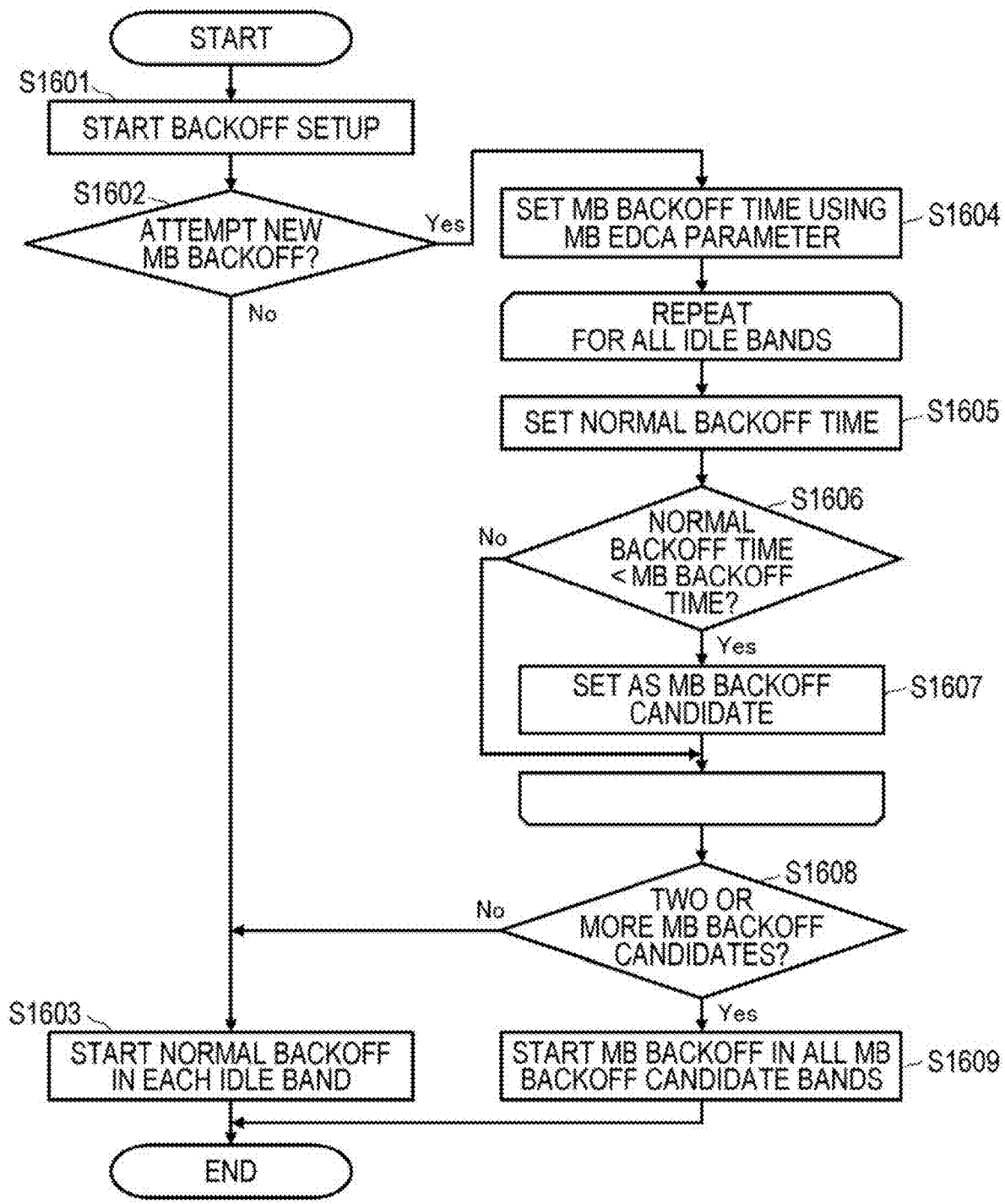
FIG. 16 is a flowchart illustrating a processing procedure (second example) when the STA performs backoff setup.

FIG. 16 illustrates a processing procedure when the STA performs backoff setup, in the form of a flowchart.

When the backoff setup is started (step S1601), the STA first determines whether to attempt to newly start MB backoff (step S1602).

In a case where STA attempts to newly start the MB backoff (Yes in step S1602), the STA sets an MB backoff time using the MB EDCA parameter specified for the data type (AC) of the packet to be transmitted in the MB backoff setup frame 1500 (step S1604).

Next, the STA repeats the processing of steps S1605 to S1607 for all bands in an idle state (i.e., bands in which backoff can be performed), and determines whether or not to add the bands to the MB backoff candidates. Specifically, the STA sets a normal backoff time in the band to be processed (step S1605). A normal backoff time is either a newly set time or a remaining time from when the previous backoff is interrupted. Next, the STA checks whether the backoff time is less than the MB backoff time determined in step S1604 (step S1606). Then, if the normal backoff time is less than the predetermined MB backoff time (Yes in step S1606), the STA adds the band to the MB backoff candidates (step S1607).

Note that as for the band determined to be out of the MB backoff candidates in steps S1606 and S1607, when MB backoff is started, normal backoff may be performed for the band alone to perform data transmission in the single band, or transmission may be put into standby until the next multiband transmission ends.

When the confirmation is completed for all the bands, the STA checks whether there are two or more bands that are MB backoff candidates (step S1608). Then, in a case where there are two or more MB backoff candidate bands (Yes in step S1608), the STA starts the MB backoff in all the MB backoff candidate bands (step S1609). At this time, the MB backoff time determined on the basis of the MB EDCA parameter in the preceding step S1604 is set as the backoff time.

On the other hand, if the STA does not newly start MB backoff (No in step S1602), the STA gives up the multiband transmission and performs normal back in each idle band (step S1603). Alternatively, in step S1603, the STA may go into standby for backoff until the corresponding band transitions to the idle state.

Additionally, the second example is different from the first example in that the CW for MB backoff is further updated after the setting of the CW value and the backoff time in each band is completed.

Figure 17:
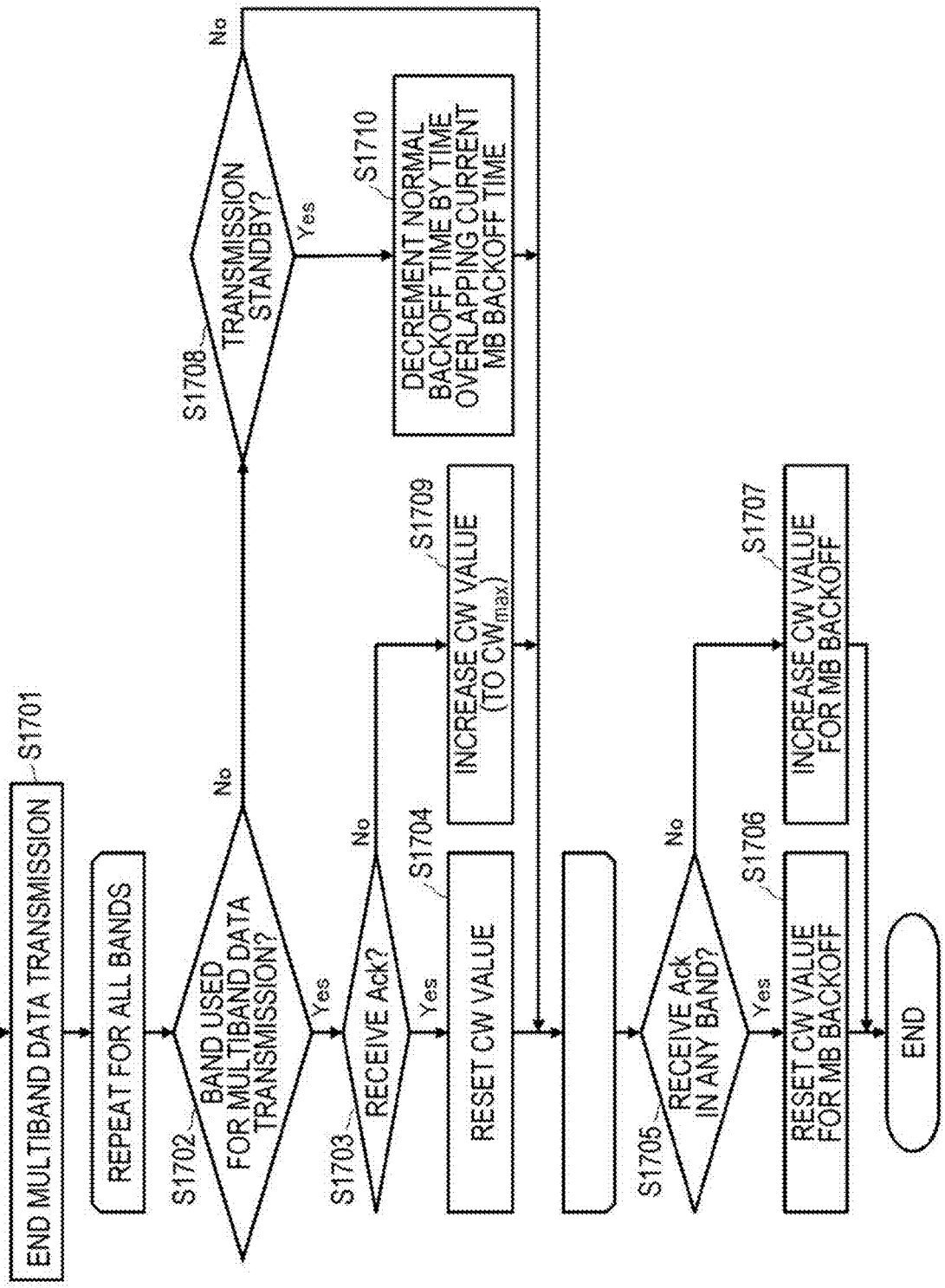
FIG. 17 is a flowchart illustrating a processing procedure (second example) for the STA to update the CW.

FIG. 17 illustrates a processing procedure for the STA to update the CW, in the form of a flowchart.

When the multiband data transmission ends (step S1701), the STA repeats the processing of steps S1702 to S1710 for all bands, and sequentially performs processing for updating the CW value for each band.

First, the STA checks whether the band to be processed is a band used for multiband data transmission (step S1702).

If the band has been used for multiband data transmission (Yes in S1702), the STA further checks whether Ack has been received in this band (step S1703). Then, if the Ack reception has been successful (Yes in step S1703), the STA resets the CW value of this band (step S1704).

On the other hand, if the Ack reception has failed (No in step S1703), the STA increases the CW value of this band (step S1709). Note, however, that the increase in the CW value in step S1709 is performed until the CW value reaches the maximum value ($CW_{max}$).

Additionally, if the band to be processed has not been used for multiband data transmission (No in step S1702), the STA further checks whether the band has been on transmission standby (step S1708). As described above, as for the band determined to be out of the MB backoff candidates, there are a case where normal backoff is performed for the band alone to perform data transmission in the single band, and a case where transmission is put into standby until the next multiband transmission ends.

Then, if the band has been on transmission standby (Yes in step S1708), the STA decrements the normal backoff time of the band by a time overlapping between the transmission standby section and the current MB backoff time (step S1710). As a result, even the band in which the STA could not perform multiband data transmission this time will be included in the MB backoff candidates at the time of the next communication, and there is a high possibility that multiband data transmission can be performed.

After updating the CW values of all the bands as described above, the STA subsequently updates the CW for MB backoff. Specifically, the STA checks whether Ack is received in any band (step S1705). Then, if the Ack reception has been successful in any of the bands (Yes in step S1705), the STA resets the CW value for MB backoff (step S1706), and ends the processing. Additionally, if the Ack reception has failed in all of the bands (No in step S1705), the STA increases the CW value for MB backoff (step S1707), and ends the processing. Note, however, that the increase in the CW value for MB backoff in step S1707 is performed until the CW value reaches the maximum value ($CW_{max}$).

Figure 18:
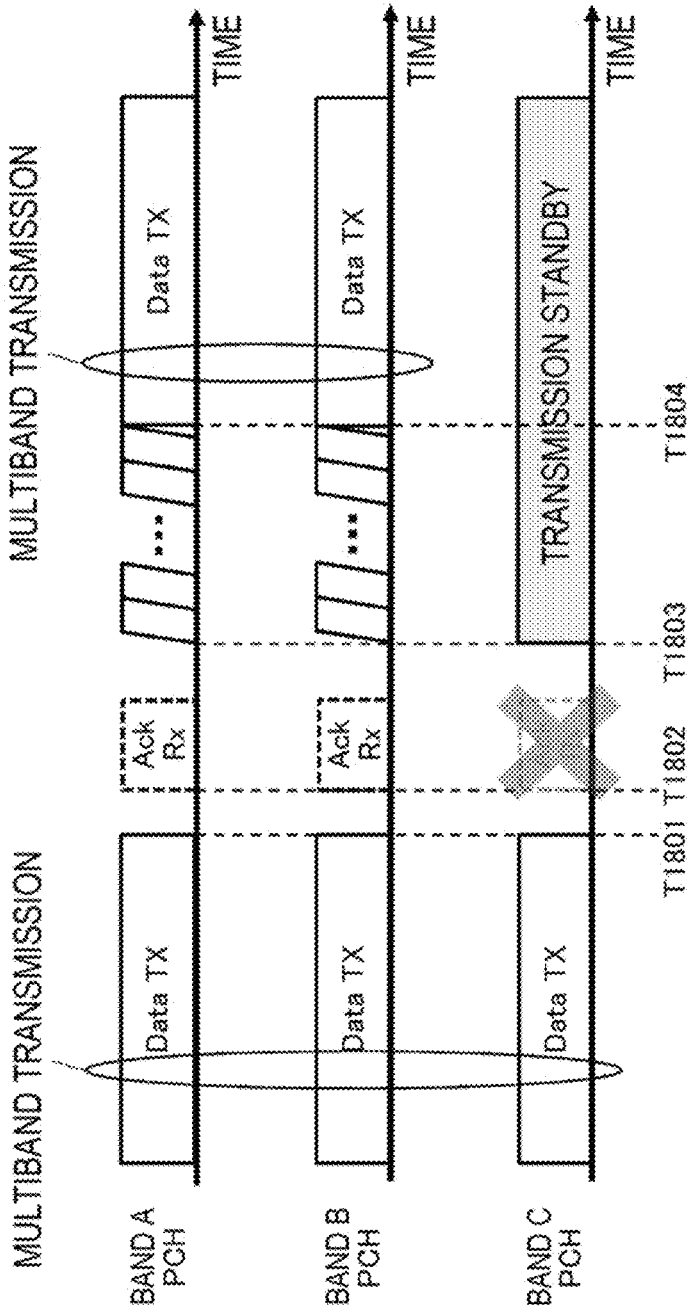
FIG. 18 is a diagram illustrating an example of a communication sequence for performing multiband transmission assumed in the second example.

FIG. 18 illustrates an example of a communication sequence for performing multiband transmission assumed in the second example. FIG. 18 illustrates an operation example for each of the band A, band B, and band C in a case where the STA performs retransmission of multiband transmission using the primary channel (PCH) of each band Note, however, that the STA is assumed to have the device configuration illustrated in FIG. 2. In FIG. 18, three horizontal axes are time axes for the bands used by the terminal (STA), and depict communication operations on the time axes. Note, however, that the STA is assumed to perform the backoff setup according to the processing procedure illustrated in FIG. 16 and update the CW value and the CW value for MB backoff according to the processing procedure illustrated in FIG. 17.

Assume that after completing the multiband transmission using the three bands A to C at time T1801, the STA can receive the Ack in the band A and the band B but cannot receive the Ack in the band C at time T1802.

Since the STA updates the CW value according to the processing procedure illustrated in FIG. 17, the STA resets the CW value in the band A and the band B in which the Ack reception has been successful, and increases the CW value in the band C in which the Ack reception has failed. As a result, the STA sets a longer backoff time in the band C. Additionally, since the Ack reception has failed in the band C, the STA increases the CW value for MB backoff.

Thereafter, the STA performs the backoff setup according to the processing procedure illustrated in FIG. 16. Since the MB backoff time is set by using the MB EDCA parameter, the increased CW value for MB backoff is used, so that a longer MB backoff time may be set.

Then, the STA itself compares the normal backoff time set for each of the bands A to C with the MB backoff time set using the MB EDCA parameter, and adds only a band whose normal backoff time is less than the MB backoff time to the MB backoff candidates. In the example illustrated in FIG. 18, since the STA sets a normal backoff time shorter than the MB backoff time to be shorter in the band A and the band B in which Ack reception has been successful, the STA adds the band A and the band B to the MB backoff candidates. On the other hand, since the STA sets a normal backoff time equal to or longer than the MB backoff time in the band C in which the reception of the Ack has failed, the STA does not add the band C to the MB backoff candidates.

Hence, at the following time T1803, the STA starts MB backoff in the band A and the band B. Then, when the MB backoff of the band A and the band B ends at time T1804, the STA starts multiband data transmission. On the other hand, the STA goes into standby for transmission in the band C after time T1803.

As described above, in the example of a communication sequence illustrated in FIG. 18, when a long backoff is set in the band C in which the Ack reception has failed, the transmission is put into standby and multiband data transmission (retransmission) is not performed in the band C. In the example of a communication sequence illustrated in FIG. 18, the band C is not set as the reference band and the MB backoff time of the STA does not become long as in the example of a communication sequence illustrated in FIG. 14. Hence, no unfairness occurs between the STA and the peripheral terminals. Note that even if the CW value of the band C is increased, a shorter backoff time can be set. In such a case, the band C is also added to the MB backoff candidates, and MB backoff synchronized with the band A and the band B can be performed.

It should be clearly understood that, according to the second example, it is not necessary to consider an erroneous setting of the reference band.

Finally, effects that can be expected by the technology disclosed in the present specification will be summarized.

According to the technology disclosed in the present specification, when MB backoff synchronized in multiple bands is performed for multiband data transmission, a backoff time (normal backoff time) set using the EDCA parameter of each band is compared with a backoff time (MB backoff time) set for multiband data transmission, and it is determined whether or not to start backoff (MB backoff) for multiband data transmission in each band, whereby a random standby time according to the communication situation of each band can be set.

Additionally, according to the technology disclosed in the present specification, by setting a random standby time according to the communication status of each band, fairness can be maintained with peripheral terminals using the same band, and an unfair situation in which a terminal that performs multiband data transmission easily acquires a transmission right, for example, can be prevented.

According to the first example, by making the backoff time (MB backoff time) for multiband data transmission designated or variable by the AP, it is possible to avoid an unfair situation in which the STA can always set a short backoff time for only the same band, and to set a random waiting time equally between the STA and the peripheral terminals.

Additionally, according to the second example, by setting the backoff time (MB backoff time) for multiband data transmission using the parameter values (MB EDCA parameters) that can be referred to in all bands, it is possible to eliminate variations in standby time caused by the method for determining a reference band. For example, it is possible to prevent a situation in which, when the reference band sets a long backoff time, a terminal has to wait for a long time to start multiband data transmission.

INDUSTRIAL APPLICABILITY

The technology disclosed in the present specification has been described in detail above with reference to specific embodiments. However, it is obvious that those skilled in the art can modify or substitute the embodiments without departing from the gist of the technology disclosed in the present specification.

In the present specification, an embodiment in which the technology disclosed in the present specification is applied to a wireless system conforming to the IEEE 802.11 standard (or EDCA scheme of IEEE 802.11e) has been mainly described. However, the gist of the technology disclosed in the present specification is not limited thereto. The technology disclosed in the present specification can be similarly applied to various types of wireless systems in which multiple bands can be used and communication is performed by simultaneously using the multiple bands, or wireless systems in which the CSMA/CA scheme is adopted and the multiple bands can be used.

Additionally, in the present specification, an example in which multiband data transmission is performed at the time of uplink transmission from the STA to the AP has been mainly described. However, it goes without saying that the technology disclosed in the present specification can be similarly applied even in a case where multiband data transmission is performed at the time of downlink transmission from the AP to the STA.

Additionally, in the present specification, the embodiment has been described in which the AP transmits an MB backoff setup frame to the subordinate STA to control the multiband communication by the STA. However, the method of controlling multiband communication is not limited thereto.

In short, the technology disclosed in the present specification has been described in the form of exemplification, but the content described in the present specification should not be interpreted in a limited manner. In order to determine the gist of the technology disclosed in the present specification, the claims should be taken into consideration.

Note that the technology disclosed in the present specification can have the following configurations.

(1) A communication device including:
a communication unit that transmits and receives wireless signals in a plurality of bands; and
a control unit that controls an operation in the communication unit, in which
the control unit sets, for each band, a first random standby time for performing transmission in each of the plurality of bands, sets a second random standby time for performing simultaneous transmission of data in two or more of the plurality of bands, and controls countdown of the second random standby time or the first random standby time of each band on the basis of a comparison between the first random standby time of each band and the second random standby time.

The communication device according to (1) above, in which
the control unit controls a data transmission operation by the communication unit after countdown of the first random standby time or the second random standby time ends.

(3) The communication device according to (1) or (2) above, in which
the control unit starts countdown of the second standby time in a band in which the first random standby time is less than the second random standby time.

(4) The communication device according to any one of (1) to (3) above, in which
the control unit performs control to simultaneously transmit data using a plurality of bands in which countdown of the second random standby time has ended.

(5) The communication device according to any one of (1) to (4) above, in which
the control unit starts countdown of the second random standby time in a case where there are two or more bands in which the first random standby time is less than the second random standby time.

(6) The communication device according to any one of (1) to (5) above, in which
the control unit does not start countdown of the second random standby time when there are less than two bands in which the first random standby time is less than the second random standby time.

(7) The communication device according to any one of (1) to (6) above, in which
when there are less than two bands in which the first random standby time is less than the second random standby time, the control unit performs control to start countdown of the first random standby time of each of the plurality of bands and perform data transmission in a band in which the countdown of the first random standby time has ended.

(8) The communication device according to any one of (1) to (7) above, in which
the control unit starts countdown of the first random standby time of each band when starting countdown of the second random standby time.

(9) The communication device according to any one of (1) to (7) above, in which
the control unit does not start countdown of the first random standby time of each band when starting countdown of the second random standby time.

(9-1) The communication device according to (9) above, in which
when starting countdown of the second random standby time, the control unit puts transmission in a band in which the first random standby time is equal to or more than the second random standby time into standby.

(10) The communication device according to (9) above, in which
the control unit subtracts a time overlapping between a transmission standby section and a second random standby time countdown section from the first random standby time of a band that is on transmission standby.

(11) The communication device according to any one of (1) to (10) above, in which
the control unit sets the first random standby time set for any one of the plurality of bands as the second random standby time.

(12) The communication device according to (11) above, in which
the control unit determines the any one band on the basis of first information notified by another communication device.

(13) The communication device according to (12) above, in which
the first information includes information for determining the any one band for each type of data to be simultaneously transmitted in two or more bands.

(14) The communication device according to (12) or (13) above, in which
the communication device notifies another communication device of the first information.

(15) The communication device according to any one of (1) to (10) above, in which
the control unit sets the second random standby time using a parameter value for performing simultaneous transmission of data in two or more bands.

(16) The communication device according to (15) above, in which
the control unit sets the second random standby time using the parameter value based on second information notified by another communication device.

(16-1) The communication device according to (16) above, in which the second information includes information on a data type, a waiting time after an end of data transmission, information on a minimum value and a maximum value of a contention window, a slot time value, and timer information for invalidating the second random standby time.

(17) The communication device according to (16) above, in which
the parameter value is set for each type of data to be simultaneously transmitted in two or more bands.

(18) The communication device according to (15) or (16) above, in which
the communication device notifies another communication device of the second information.

(19) The communication device according to any one of (1) to (18) above, in which
the communication device exchanges information regarding whether or not to set the second random standby time for performing simultaneous transmission of data in two or more bands with another communication device.

(20) A communication method including the steps of:
setting, for each band, a first random standby time for performing transmission in each of a plurality of bands;
setting a second random standby time for performing simultaneous transmission of data in two or more of the plurality of bands; and
controlling countdown of the second random standby time or the first random standby time of each band on the basis of a comparison between the first random standby time of each band and the second random standby time.

(21) A communication device including:
a communication unit that transmits and receives wireless signals in at least one of a plurality of bands; and
a control unit that controls an operation in the communication unit, in which
the control unit performs control to notify another communication device of control information regarding setting of a second random standby time for performing simultaneous transmission of data in two or more of the plurality of bands.

(22) The communication device according to (21) above, in which
the control information includes first information for determining a band to be a reference for setting the second random standby time among the plurality of bands.

(23) The communication device according to (21) above, in which
the control information includes second information designating a parameter value for performing simultaneous transmission of data in two or more bands.

(24) A communication method including the steps of:
generating control information regarding setting of a second random standby time for performing simultaneous transmission of data in two or more of a plurality of bands;
notifying another communication device of the control information; and
receiving data simultaneously transmitted in the two or more of the plurality of bands from the another communication device.

REFERENCE SIGNS LIST

200 Communication device
210 Antenna unit
211 Antenna (for band A)
212 Antenna (for band B)
213 Antenna (for band C)
220 Wireless communication unit
221 Wireless communication unit (for band A)
222 Wireless communication unit (for band B)
223 Wireless communication unit (for band C)
230 Data processing unit
231 Data processing unit (PHY layer processing for band A)
232 Data processing unit (PHY layer processing for band B)
233 Data processing unit (PHY layer processing for band C)
234 Data processing unit (MAC layer processing)
240 Communication control unit

The invention claimed is:

1. A communication device comprising:
a transceiver configured to transmit and receive wireless signals in a plurality of bands; and
circuitry configured to control an operation in the transceiver, wherein
the circuitry is configured to set, for each band, a first random standby time for performing transmission in each of the plurality of bands, set a second random standby time for performing simultaneous transmission of data in two or more of the plurality of bands, and control a countdown of the second random standby time or a countdown of the first random standby time of each band on a basis of a comparison between the first random standby time of each band and the second random standby time,
wherein, when there are less than two bands in which the first random standby time is less than the second random standby time, the circuitry is configured to perform control to start the countdown of the first random standby time of each of the plurality of bands and perform data transmission in a band in which the countdown of the first random standby time has ended.

2. The communication device according to claim 1, wherein
the circuitry is configured to control a data transmission operation by the transceiver after the countdown of the first random standby time or the countdown of the second random standby time ends.

3. The communication device according to claim 1, wherein
the circuitry is configured to start the countdown of the second standby time in a band in which the first random standby time is less than the second random standby time.

4. The communication device according to claim 1, wherein
the circuitry is configured to perform control to simultaneously transmit data using a plurality of bands in which the countdown of the second random standby time has ended.

5. The communication device according to claim 1, wherein
the circuitry is configured to start the countdown of the second random standby time in a case where there are two or more bands in which the first random standby time is less than the second random standby time.

6. The communication device according to claim 1, wherein
the circuitry is configured to not start the countdown of the second random standby time when there are less than two bands in which the first random standby time is less than the second random standby time.

7. The communication device according to claim 1, wherein
the circuitry is configured to start the countdown of the first random standby time of each band when starting the countdown of the second random standby time.

8. A communication device comprising:
a transceiver configured to transmit and receive wireless signals in a plurality of bands; and
circuitry is configured to control an operation in the transceiver, wherein
the circuitry is configured to set, for each band, a first random standby time for performing transmission in each of the plurality of bands, set a second random standby time for performing simultaneous transmission of data in two or more of the plurality of bands, and control a countdown of the second random standby time or a countdown of the first random standby time of each band on a basis of a comparison between the first random standby time of each band and the second random standby time,
wherein the circuitry is configured to not start the countdown of the first random standby time of each band when starting the countdown of the second random standby time, and
wherein the circuitry is configured to subtract a time overlapping between a transmission standby section and a second random standby time countdown section from the first random standby time of a band that is on transmission standby.

9. The communication device according to claim 1, wherein
the circuitry is configured to set the first random standby time set for any one of the plurality of bands as the second random standby time.

10. The communication device according to claim 9, wherein
the circuitry is configured to determine the any one band on a basis of first information notified by another communication device.

11. The communication device according to claim 10, wherein
the first information includes information for determining the any one band for each type of data to be simultaneously transmitted in two or more bands.

12. The communication device according to claim 10, wherein
the communication device notifies another communication device of the first information.

13. The communication device according to claim 1, wherein
the circuitry is configured to set the second random standby time using a parameter value for performing simultaneous transmission of data in two or more bands.

14. The communication device according to claim 13, wherein
the circuitry is configured to set the second random standby time using the parameter value based on second information notified by another communication device.

15. The communication device according to claim 14, wherein
the parameter value is set for each type of data to be simultaneously transmitted in two or more bands.

16. The communication device according to claim 13, wherein
the communication device notifies another communication device of the second information.

17. The communication device according to claim 1, wherein
the communication device exchanges information regarding whether or not to set the second random standby time for performing simultaneous transmission of data in two or more bands with another communication device.

18. A communication method comprising the steps of:
setting, for each band, a first random standby time for performing transmission in each of a plurality of bands;
setting a second random standby time for performing simultaneous transmission of data in two or more of the plurality of bands;
controlling a countdown of the second random standby time or a countdown of the first random standby time of each band on a basis of a comparison between the first random standby time of each band and the second random standby time; and
when there are less than two bands in which the first random standby time is less than the second random standby time, starting the countdown of the first random standby time of each of the plurality of bands and performing data transmission in a band in which the countdown of the first random standby time has ended.

* * * * *